US007252027B2

(12) United States Patent
Meredith et al.

(10) Patent No.: US 7,252,027 B2
(45) Date of Patent: Aug. 7, 2007

(54) MITER SAW

(75) Inventors: Daryl S. Meredith, Hampstead, MD (US); Thomas R. Kaye, Jr., Bel Air, MD (US); Thomas Trevor Bludis, Parkville, MD (US); Maria I. Kenyon, Taneytown, MD (US); William R. Stumpf, Kingsville, MD (US); Michael L. O'Banion, Westminster, MD (US); Craig A. Oktavec, Forest Hill, MD (US); Stuart J. Wright, Timonium, MD (US); Mark E. Brunson, Bel Air, MD (US); Carrie L. Puschmann, Fayetteville, NC (US)

(73) Assignee: Black & Decker Inc., Newark, DE (US)

( * ) Notice: Subject to any disclaimer, the term of this patent is extended or adjusted under 35 U.S.C. 154(b) by 115 days.

(21) Appl. No.: 10/056,312

(22) Filed: Jan. 24, 2002

(65) Prior Publication Data

US 2002/0152867 A1 Oct. 24, 2002

Related U.S. Application Data

(60) Provisional application No. 60/267,371, filed on Feb. 8, 2001.

(51) Int. Cl.
*B26D 1/14* (2006.01)
*B27B 5/00* (2006.01)
*B27B 27/06* (2006.01)

(52) U.S. Cl. .................... 83/471.3; 83/468.3; 83/473; 83/581

(58) Field of Classification Search .............. 83/471.3, 83/468.3, 581, 491, 471.1, 490, 563, 473, 83/477.1, 522.11, 471.2, 486.1
See application file for complete search history.

(56) References Cited

U.S. PATENT DOCUMENTS

| 1,958,538 | A | * | 5/1934 | Hallden ...................... 83/298 |
| 3,556,177 | A | * | 1/1971 | Cleland ...................... 83/812 |
| 3,757,838 | A | * | 9/1973 | Lee ........................... 144/424 |
| 4,433,589 | A | * | 2/1984 | Chaconas ..................... 74/325 |
| 4,531,441 | A | * | 7/1985 | Bergler ..................... 83/471.3 |

(Continued)

FOREIGN PATENT DOCUMENTS

DE  29814706 U1  12/1998

(Continued)

OTHER PUBLICATIONS

D. Chariot, European Search Report, Nov. 7, 2003, The Hague.

(Continued)

*Primary Examiner*—Kenneth E. Peterson
*Assistant Examiner*—Isaac Hamilton
(74) *Attorney, Agent, or Firm*—Adan Ayala

(57) ABSTRACT

The miter saw includes a base assembly, a rotatable table rotatably connected to the base assembly and having a plane, a saw assembly including a motor and a blade disposed on an arbor, and a pivot arm pivotally attached to the table and supporting the saw assembly. The motor preferably drives a belt, which drives a first gear. The first gear meshes with an idler gear, which in turn meshes with a gear disposed on the arbor.

7 Claims, 19 Drawing Sheets

U.S. PATENT DOCUMENTS

| | | | | |
|---|---|---|---|---|
| 4,606,386 | A | * | 8/1986 | Walker .................... 144/135.3 |
| 4,694,721 | A | * | 9/1987 | Brickner, Jr. .............. 83/471.3 |
| 5,159,870 | A | * | 11/1992 | Fiala ........................... 83/863 |
| 5,393,270 | A | * | 2/1995 | Grobbelaar .................... 474/5 |
| 5,425,294 | A | | 6/1995 | Ushiwata et al. |
| 5,839,339 | A | | 11/1998 | Sasaki et al. |
| 5,974,927 | A | * | 11/1999 | Tsune .......................... 83/490 |
| 6,532,853 | B1 | | 3/2003 | Kakimoto et al. |

FOREIGN PATENT DOCUMENTS

| | | |
|---|---|---|
| EP | 0950482 A2 | 10/1999 |
| FR | 1135035 A | 4/1957 |
| JP | 08252801 A | 10/1996 |
| JP | 11034002 A | 2/1999 |
| JP | 11048029 A | 2/1999 |

OTHER PUBLICATIONS

Annex to the European Search Report on European Patent Application No. EP 02250835.

David Chariot, European Search Report, Feb. 7, 2007, The Hague.

Annex to the European Search Report on European Patent Application No. EP 07 10 0264.

* cited by examiner

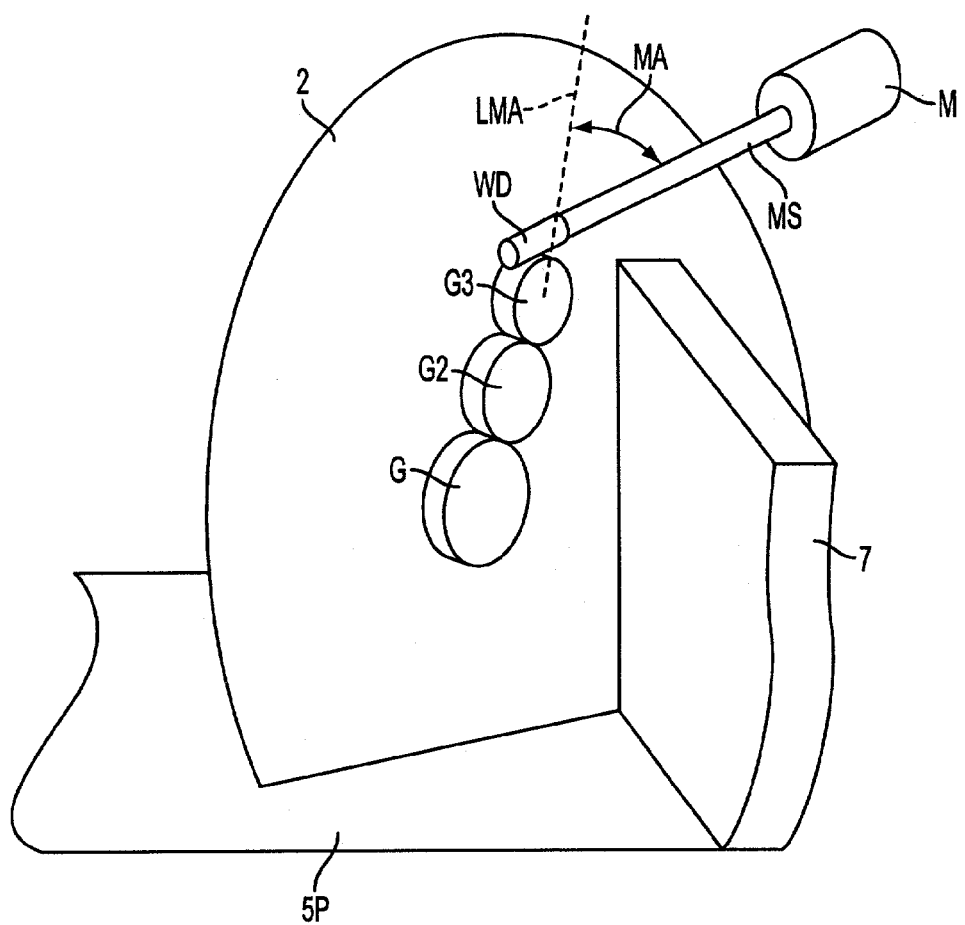
FIG. 9A
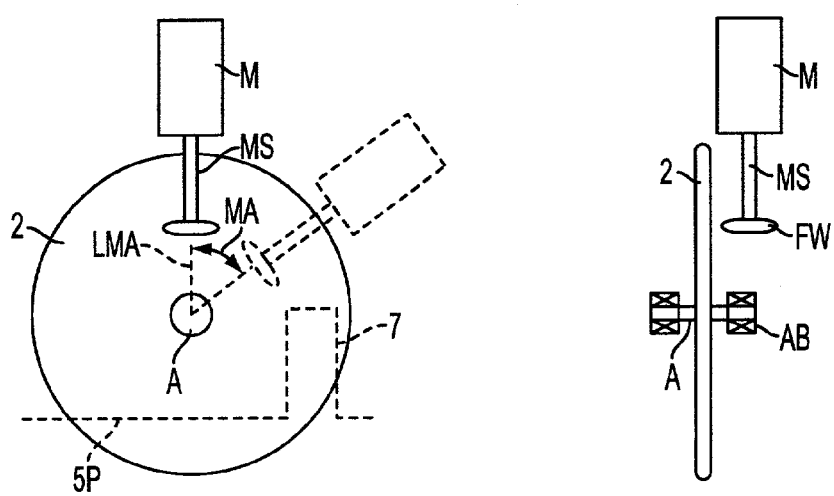 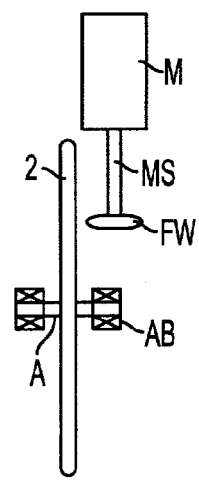
FIG. 10A         FIG. 10B

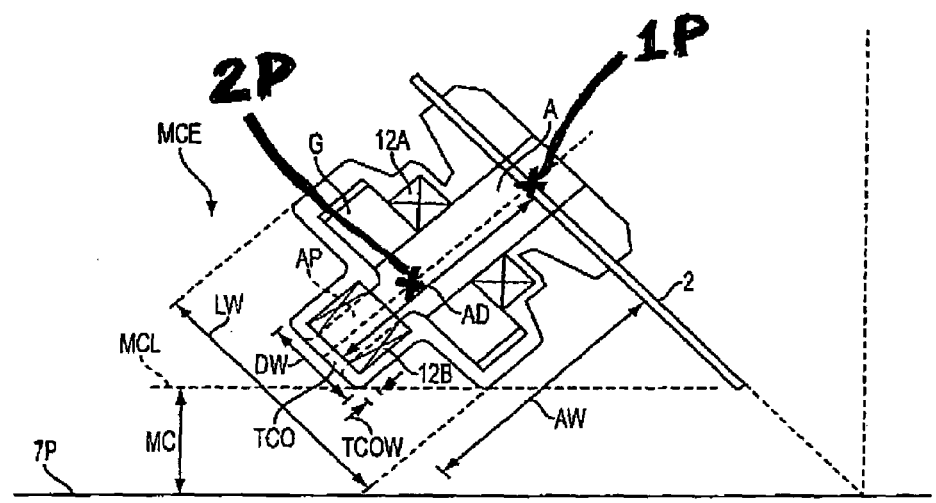
FIG. 13
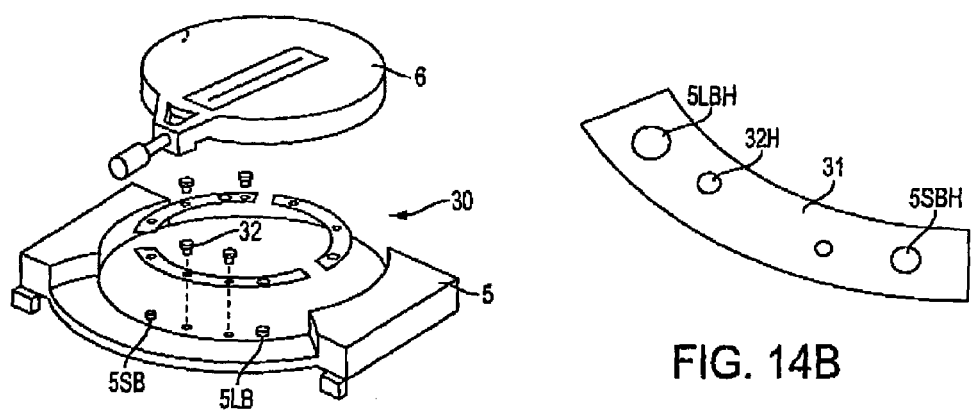
FIG. 14A
FIG. 14B

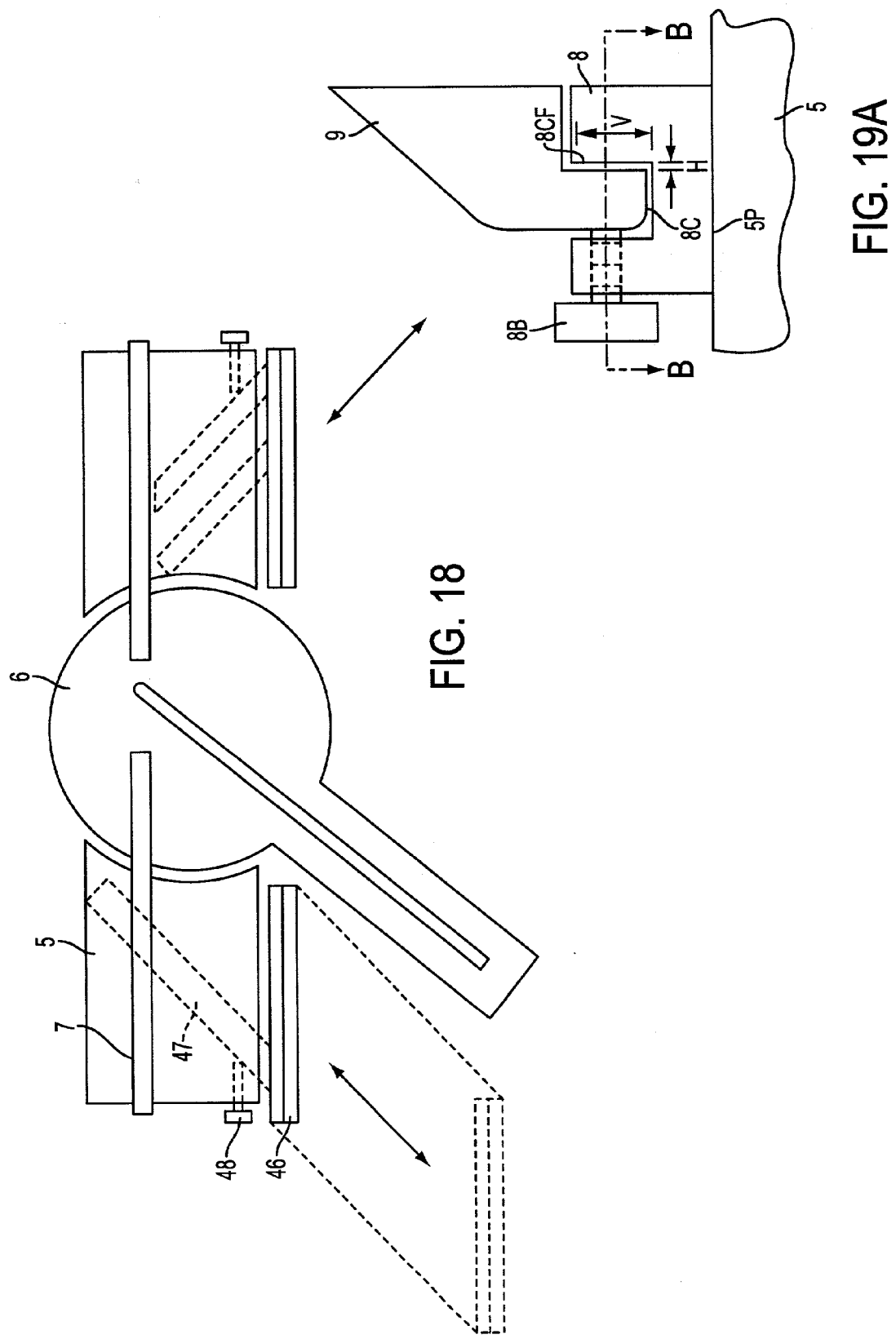

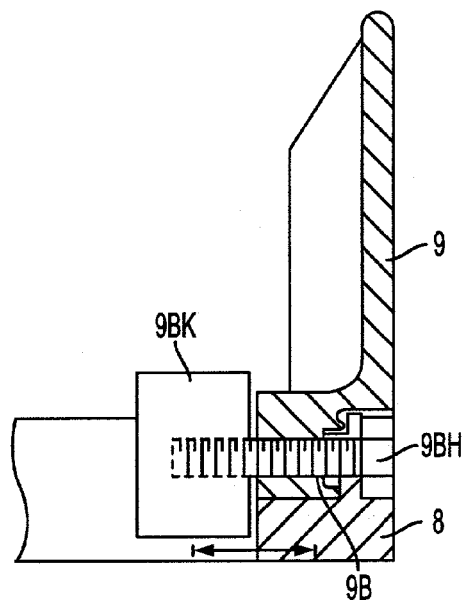
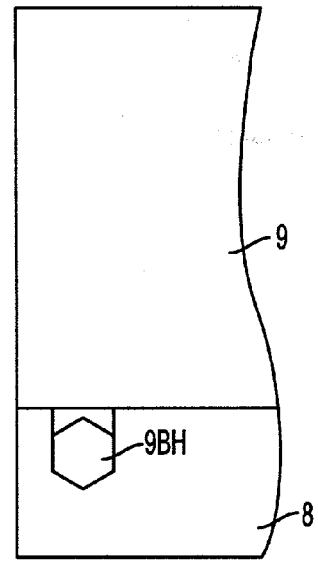
FIG. 20A          FIG. 20B
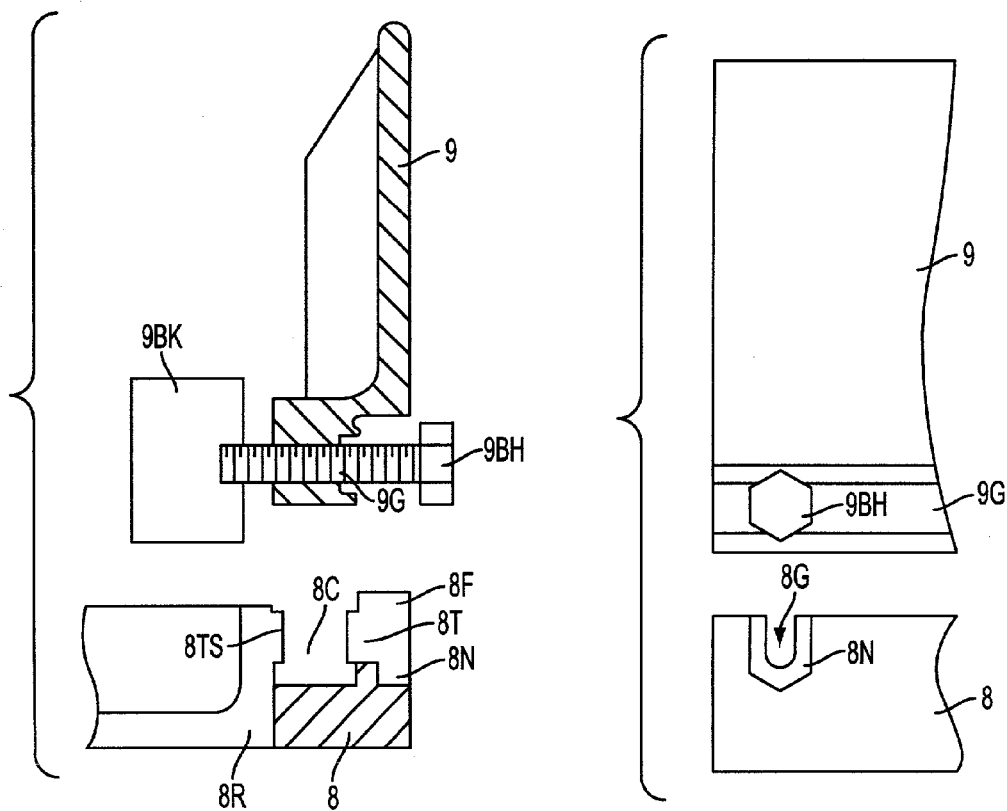
FIG. 20C          FIG. 20D

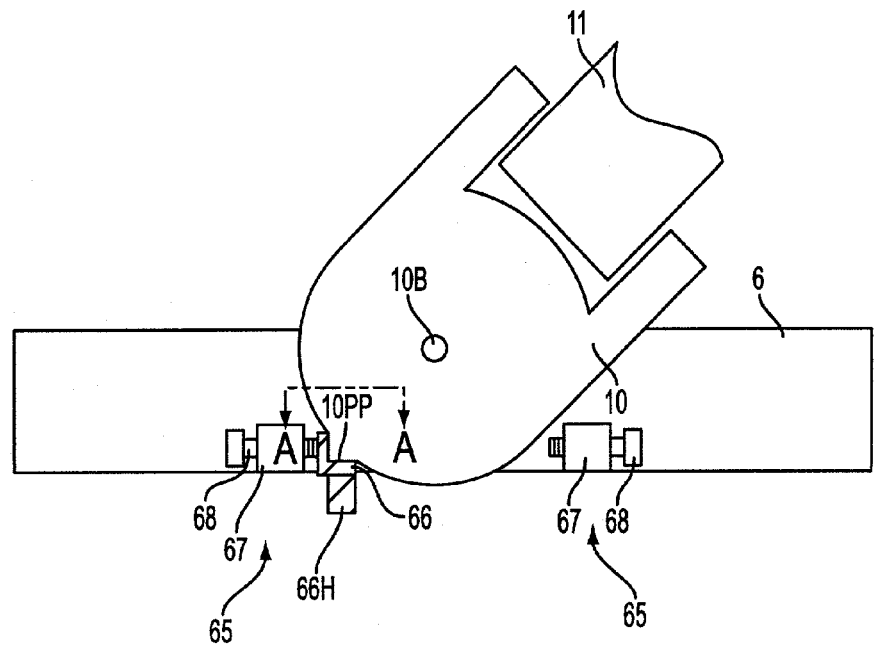
FIG. 27A
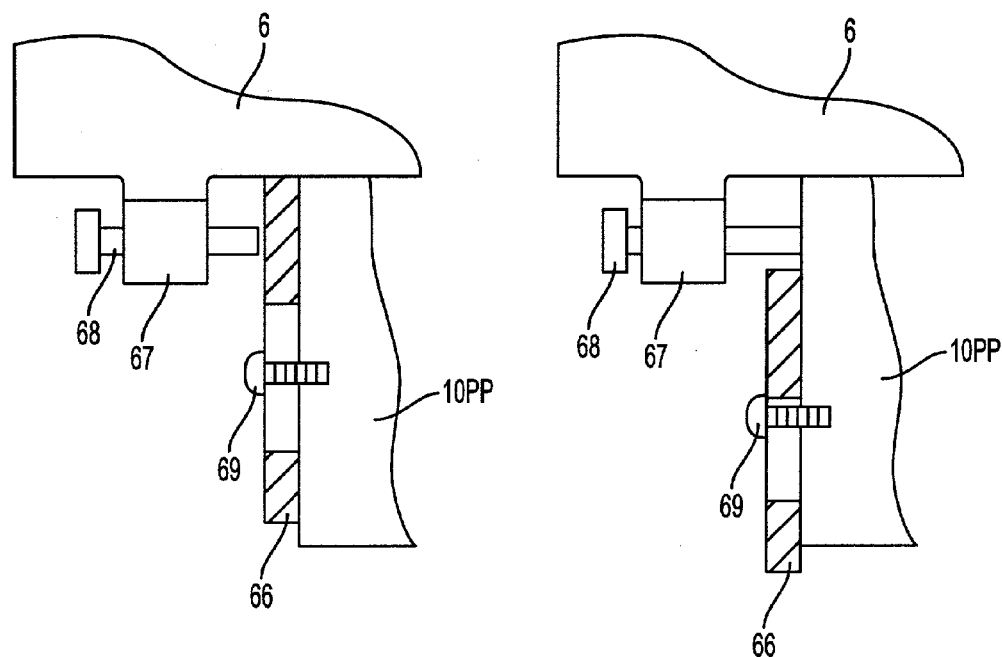
FIG. 27B
FIG. 27C

MITER SAW

CROSS-REFERENCE TO RELATED APPLICATIONS

This application derives priority under 35 USC §119(e) from U.S. application Ser. No. 60/267,371, filed Feb. 8, 2001, now abandoned.

FIELD OF THE INVENTION

This invention relates generally to miter saws.

BACKGROUND OF THE INVENTION

As shown in FIGS. 1-5, a typical miter saw 1 has a base assembly 5, including a rotatable table 6 rotatably connected to the base assembly 5, a saw assembly including a motor M and a blade 2 driven by the motor M, a pivot arm 11 pivotally attached to the table 6 via pivot junction 10 and supporting the saw assembly, allowing a user to move the saw assembly towards and away from the base assembly 5 for cutting a workpiece.

Lower blade guard 3 typically covers the lower side of the blade 2, while upper blade guard 4 typically covers the upper side of the blade 2. Typically miter saw 1 would have a guard opening mechanism that moves lower blade guard 3 as the saw assembly is pivoted towards the base assembly, thus exposing the blade 2 to the workpiece.

Typically the motor M has a drive shaft MS meshing with a gear G, which in turn rotates arbor A. A motor housing MH covers the motor M. A miter saw can be used for cutting crown molding, wood beams, etc.

The miter saw 1 also has fences on both sides of the blade 2. If the miter saw 1 does not bevel or if it bevels left, the fence 7 to the right of blade 2 typically does not slide. The miter saw 1 may also have a sliding fence on the left side of blade 2, where a fixed fence 8 is attached to base assembly 5, and a movable fence 9 is connected to fixed fence 8. At least one of the fixed fence 8 and the movable fence 9 is typically coplanar with fence 7, forming a fence plane.

Typically, the cutting capacity of a miter saw is limited because of its blade size and/or geometry. For example, most currently available twelve-inch non-sliding miter saws can cut moldings 5.25 inches high when the miter angle, i.e., the angle between the blade 2 and the fence plane, is zero degrees or mitered to the left. However, when the miter table 6 is mitered rightwardly, e.g., when the miter angle is about 45O°, the cutting capacity is sharply reduced. This is because the tall workpiece W3 fits between the fence plane and the motor housing MH when the miter angle is, for example, zero degrees. However, when the miter saw is mitered rightwardly, as shown in FIG. 4, the motor housing MH contacts the workpiece W3, restricting the cutting capacity.

Similarly, because of the typical geometry of the miter saws, the maximum width cutting capacity varies according to the miter angle. Typically, a twelve-inch miter saw can cut a workpiece W2 laid flat on the miter saw that is about 7.875 inches wide. When the miter saw is mitered 45O°, the miter saw can cut a workpiece that is about 5.5 inches wide.

Accordingly, if a user wants to cut a board that is larger than the cutting capacity of the miter saw, the user would need to purchase a larger miter saw, with a larger blade, higher weight, higher price, etc. Alternatively, the user could use a radial arm saw or sliding miter saw. But these are also more expensive, etc.

SUMMARY OF THE INVENTION

In accordance with the present invention, an improved miter saw is employed. The miter saw includes a base assembly, a rotatable table rotatably connected to the base assembly and having a plane, a saw assembly including a motor and a blade disposed on an arbor, and a pivot arm pivotally attached to the table and supporting the saw assembly. The motor preferably drives a belt, which drives a first gear. The first gear meshes with an idler gear, which in turn meshes with a gear disposed on the arbor.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 9A is a partial perspective view of another embodiment of a miter saw according to the invention;

FIG. 10 illustrates yet another embodiment of a miter saw according to the invention, where FIG. 10A is a side elevational view and FIG. 10B is a partial front elevational view;

FIG. 13 is a partial cross-sectional view of the blade arbor assembly in the miter saw of FIG. 7;

FIG. 14 illustrates a wear system according to the invention, where FIG. 14A is an exploded view of the base assembly and FIG. 14B is a top plan view of a wear strip;

FIG. 17 shows a first embodiment of a workpiece support assembly, where

FIG. 18 is a top plan view of a second embodiment of a workpiece support assembly;

FIG. 19 shows a sliding fence assembly, where FIG. 19A is a partial cross-sectional view along line A-A of FIG. 1.

FIG. 20 shows a removable fence assembly, where FIGS. 20A and 20B are partial cross-sectional side and front elevational views of the installed removable fence, respectively, and FIGS. 20C and 20D are partial cross-sectional side and front elevational views of the removed removable fence, respectively;

FIG. 21 shows a fence assembly, where

FIG. 22 shows another embodiment of a removable fence, where

FIG. 23 shows a sliding fence assembly, where

FIG. 26 shows a first embodiment of a bevel stop mechanism, where

FIG. 27 shows a second embodiment of a bevel stop mechanism, where FIG. 27A is a partial rear view and FIGS. 27B and 27C are a partial top plan views along line A-A of FIG. 27A;

FIG. 28 illustrates an embodiment of a handle according to the invention, where

DETAILED DESCRIPTION

Figure 6:
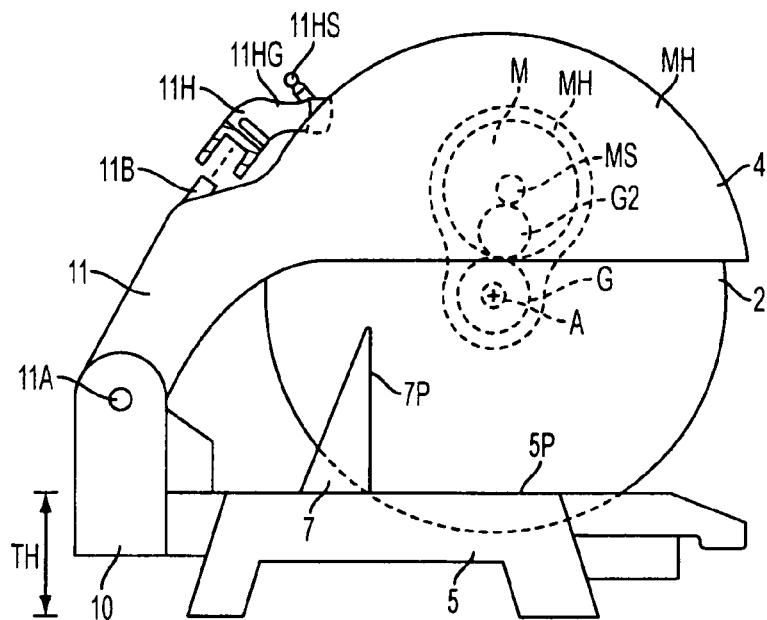
FIG. 6 is a side elevational view of a first embodiment of a miter saw according to the present invention.
Figure 28A:
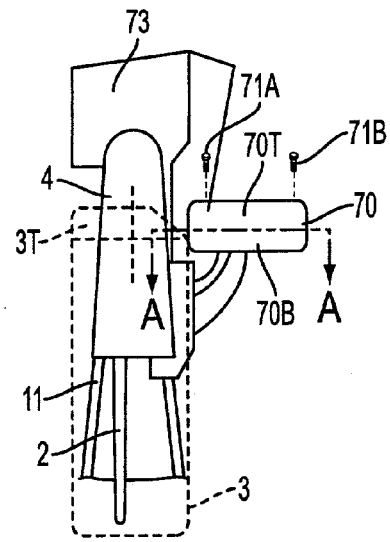
FIG. 28A is a partial front elevational view.

The invention is now described with reference to the accompanying figures, wherein like numerals designate like parts. FIG. 6 shows a first embodiment of the inventive miter saw. Referring to FIG. 6, the miter saw 1 has a base assembly 5, including a rotatable table 6 rotatably connected to the base assembly 5, a saw assembly including a motor M and a blade 2 driven by the motor M, and a pivot arm 11 pivotally attached to the table 6 via pivot junction 10 and supporting the saw assembly, allowing a user to move the saw assembly towards and away from the base assembly 5 for cutting a workpiece. Preferably, both the base assembly 5 and table 6 are coplanar. The height TH of the table plane 6P and/or base plane 5P is about 3.5 inches. Such height will allow a user to place boards commonly known as "four by fours" (which have a height and width of about 3.5 inches) next to base assembly 5 for supporting a workpiece thereon. Preferably, a lower guard 3 for covering the lower part of the blade 2 has a tab 3T, that allows the user to manually move the guard 3 towards a position exposing blade 2 (see FIG. 28A).

The motor M has a drive shaft MS meshing with an idler gear G2, which in turn meshes with gear G. Gear G in turn rotates arbor A. A motor housing MH covers the motor M.

Persons skilled in the art will recognize that, by increasing the radius of gear G2, the distance between motor M and base assembly 5 is increased. Persons skilled in the art will also recognize that, by increasing such distance, it is possible to raise the motor M so that it does not contact base assembly 5 when the saw assembly is beveled towards the motor side, i.e., the right side as shown in FIG. 6. Persons skilled in the art should also recognize that gear G2 may be positioned towards the front of the saw, so that motor M also lies substantially in front of gear G.

A handle 11H may be provided on pivot arm 11. Preferably, pivot arm has a boss 11B for receiving one end of the handle 11H. The other end of handle may be screwed onto upper guard 4, pivot arm 11 or motor housing MH via screw 11HS. Persons skilled in the art will recognize that such arrangement minimizes the number of screws required for attaching handle 11H. Preferably, handle 11H will have a portion 11HH, which is substantially horizontal when the saw assembly is in a lower position (as shown in FIG. 6). Horizontal portion 11HH may be the portion closest to boss 11B or closest to where 11S is disposed.

Persons skilled in the art will recognize that the miter saw 1 also has fences 7 on both sides of the blade 2. Preferably both fences slide if the miter saw 1 bevels left and right. Also both fences may be coplanar.

Figure 7:
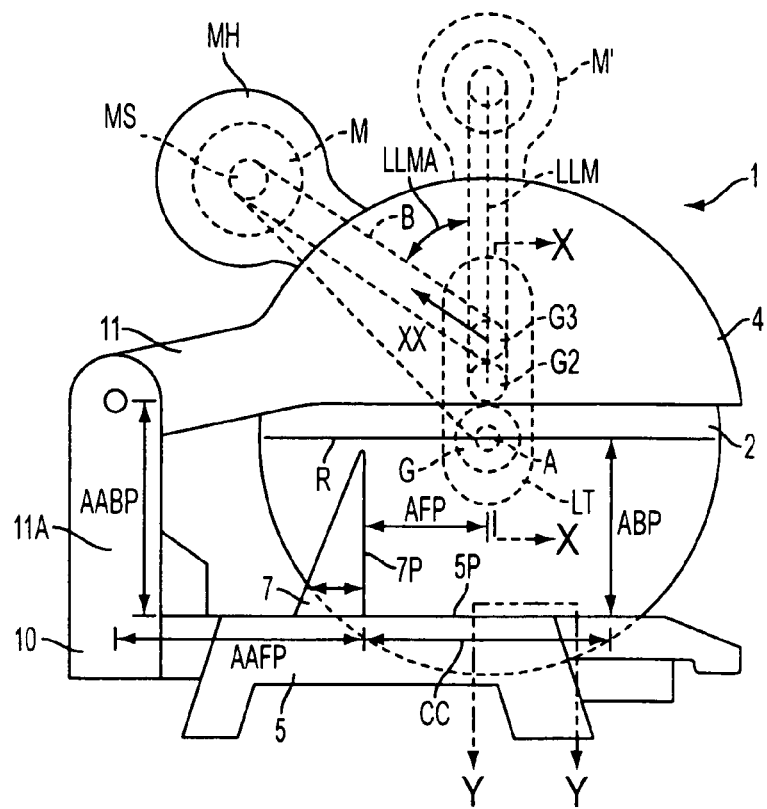
FIG. 7 is a side elevational view of a second embodiment of a miter saw according to the present invention.

FIG. 7 shows a second embodiment of the miter saw. The lessons learned from the first embodiment are incorporated wholly herein by reference. The main difference is that the motor M is disposed near or adjacent the outer perimeter or periphery of upper blade guard 4. Alternatively, motor M (and housing MH) could be wholly or partly supported by pivot arm 11.

In this embodiment, drive shaft MS is connected to a third gear G3 via a belt B. Third gear G3 is turn meshingly connected to gear G2, which in turn is meshed with gear G. Persons skilled in the art will recognize that a chain or other transmission device could be used instead of belt B.

As mentioned above, the saw assembly is pivotable about an axis 11A. The distance between the axis 11A and the plane 5P of the base assembly 5 and/or table 6 is distance MBP. Preferably the distance AABP is between about 0.79 and about 0.80 times (or greater) the radius R of blade 2. In a twelve-inch miter saw with a blade having a radius between about 5.97 inches (15.16 cm) and about 6.03 inches (15.316 cm), the distance AABP may be between about 11.98 cm and about 12.25 cm. The distance AABP should be at least 12.077 cm and is preferably about 12.10 cm. Persons skilled in the art should recognize that distance AABP is preferably the distance ABP plus about half the difference between the desired maximum cutting height and distance ABP.

It is preferable that during the chopping operation, the arbor A reaches a point where the distance between the arbor A and the plane 5P of the base assembly 5 and/or table 6 is distance ABP. Preferably the distance ABP is between about 0.671 and about 0.6775 times the radius R of blade 2. In a twelve-inch miter saw with a blade having a radius between about 15.16 cm and about 15.316 cm, the distance ABP may be between about 10.17 cm and about 10.38 cm. Preferably, the distance ABP is about 10.271 cm.

Similarly, the distance between the axis 11A and the plane 7P of fence 7 is distance AAFP. Preferably the distance AAFP is between about 1.28 and about 1.292 times the radius R (or greater). Accordingly, in a twelve-inch miter saw, the distance AAFP may be between about 19.40 cm and about 19.80 cm. Preferably, the distance AAFP is about 19.585 cm.

Furthermore, the distance between the arbor A and the plane 7P of fence 7 is distance AFP, where the saw assembly is pivoted downwardly. Preferably the distance AFP is between about 0.60 and about 0.61 times the radius R. Accordingly, in a twelve-inch miter saw, the distance AFP may be between about 9.10 cm and about 9.35 cm. Preferably, the distance AFP is about 9.164 cm.

Persons skilled in the art will recognize that, with such arrangement, the base plane 5P intersects blade 2, forming a chord. The length of this chord would constitute the cutting width capacity, but for the placement of the fences. Accordingly, the horizontal cutting capacity would be the distance between the front endpoint of the chord and the fence plane 7P, i.e., distance CC. Preferably, distance CC is at least 1.1 times the radius R. It is preferable that distance CC is at least about 1.31 times the radius R, or at least about 20 cm for a twelve-inch blade. Preferably, distance CC is about 20.3 cm for a twelve-inch blade.

Persons skilled in the art will recognize that it may be preferable to provide a pivoting axis 11A that is higher than the arbor A, when the arbor A is in its lowermost position.

Also, persons skilled in the art will recognize that, in the embodiment of FIG. 7, if an imaginary triangle is formed between the drive shaft MS, the third gear G3 and the arbor A, the belt B will substantially follow one side of the triangle. This side will be shorter and higher than the line XX between the drive shaft MS and the arbor A. Forming this imaginary triangle creates a "pocket" between the belt B and the arbor A that allows arbor A to pivot lower without belt B or upper guard 4 contacting a workpiece. Persons skilled in the art should recognize that by increasing the distance between third gear G3 and arbor A, the pocket is advantageously enlarged.

The pocket may also be enlarged by decreasing the angle between the two sides converging in arbor A. This will effectively move the motor M towards the front of the saw (see motor M' in broken lines in FIG. 7). Preferably motor M will lie outside of the perimeter of upper blade guard 4. Persons skilled in the art will recognize that motor M can be placed at different angles. In FIG. 7, a vertical line LLM bisects gear G3. The angle LLMA between line LLM and belt B can be between about 90° (where the motor M is in the rear of the saw, i.e., closest to axis 11A) and about −102° (where the motor is in the front of the saw). These angles are applicable where the motor housing MH has a diameter of about 100 mm. Larger angles may be obtained with smaller motor housing diameters. Nevertheless, the preferred angle between the line LLM and belt B is about 68°.

Figure 8:
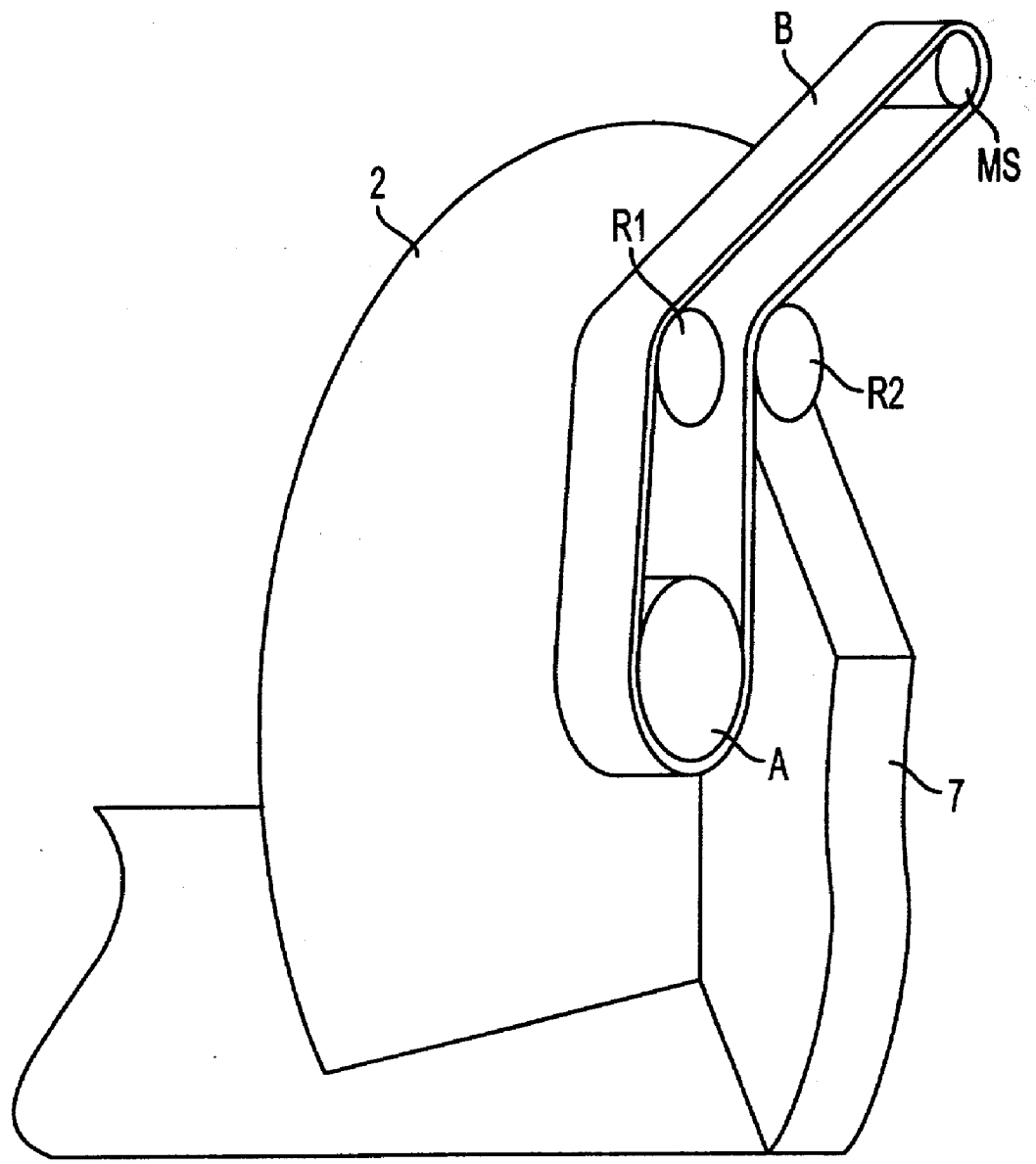
FIG. 8 is a partial perspective view of a third embodiment of a miter saw according to the present invention.

Persons skilled in the art will recognize that the transmission, i.e., belt B and the different gears G, G2 and G3, shown in FIG. 7 could be implemented differently. For example, gears G, G2 and G3 could be replaced by a second belt between arbor A and a shaft replacing gear G3. Alternatively, belt B may be disposed between drive shaft MS and arbor A. In order to obtain the pocket, two rollers R1 and R2 may be disposed in the path of belt B, as shown in FIG. 8.

Figure 9:
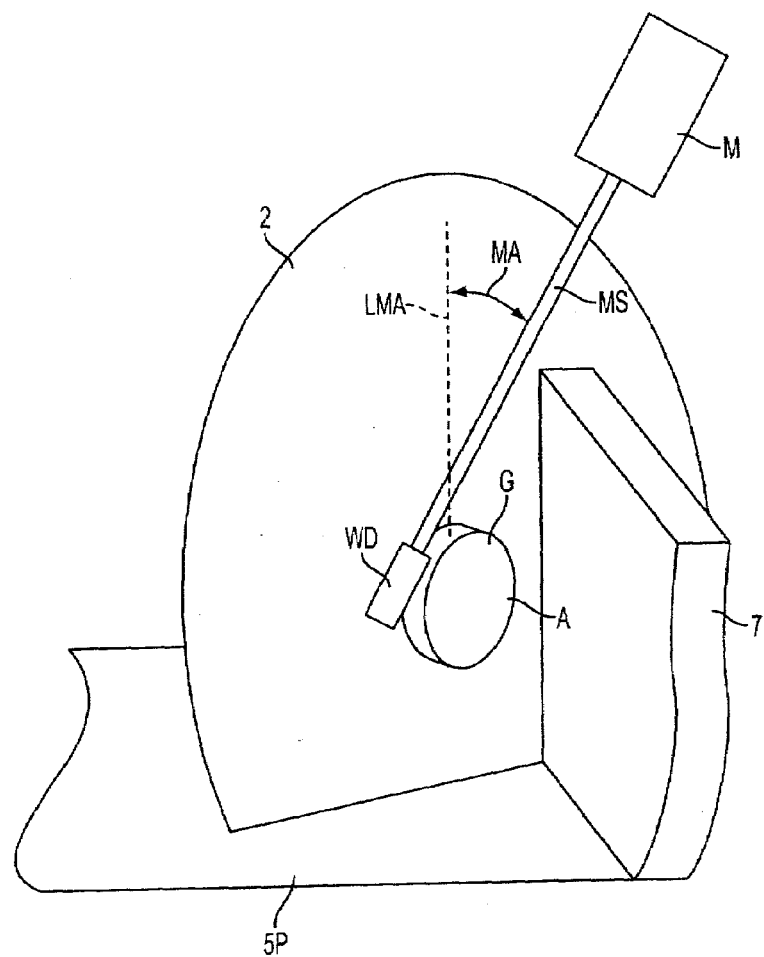
FIG. 9 is a partial perspective view of a fourth embodiment of a miter saw according to the present invention.

FIG. 9 shows another method for creating the pocket around the fence 7 without using a "bent" transmission. As shown in FIG. 9, the motor M has a drive shaft MS. Preferably drive shaft MS has a worm drive gear WD (or a bevel gear) that meshes with the gear G of arbor A. Persons skilled in the art will note that at least one of the motor and/or the drive shaft MS is substantially perpendicular to the axis of rotation of blade 2. Persons skilled in the art will also recognize that, if an imaginary line LMA is drawn substantially perpendicular to base plane 5P, angle MA between line LMA and drive shaft MS (when blade 2 is in the cutting position) can be between about 47° (where the motor is in the rear of the saw) and about −90° (where the motor is in the front of the saw).

The range of angle MA may be increased if the gear assembly G/G2/G3 of FIG. 7 is used. As shown in FIG. 9A, angle MA may be between about 96° (where the motor is in the rear of the saw) and about −103° (where the motor M is in the front of the saw).

Nevertheless, it is preferable to minimize the angle MA between the imaginary line and drive shaft MS. Persons skilled in the art should recognize that motor M can be substantially parallel to the axis of rotation of blade 2 by providing a bevel gear between drive shaft MS and the motor M.

Another way of creating the appropriate clearance is to eliminate the connection between the arbor A of blade 2 with motor M. This can be achieved by providing motor shaft MS with a friction wheel FW as shown is FIG. 10. Friction wheel FW rotates and drives blade 2 upon rotation of motor shaft MS. Preferably, friction wheel FW is disposed substantially perpendicular to motor shaft MS. Motor shaft MS is preferably extending along the radius of blade 2.

Persons skilled in the art will recognize that, if a line LMA is drawn substantially perpendicular to base plane 5P and substantially bisecting arbor A, angle MA between line LMA and motor shaft MS (when blade 2 is in the cutting position) is preferably about 47° (where the motor M is in the rear of the saw) and about−90° (where the motor M is in the front of the saw).

Figure 11:
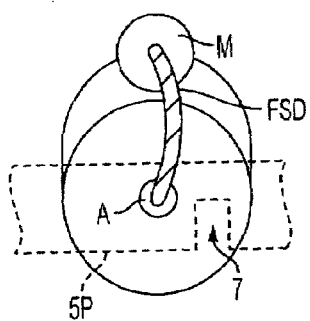
FIG. 11 is a side elevational view of another embodiment of a miter saw according to the invention.

The appropriate clearance may also be created by providing a flexible shaft FSD between arbor A and motor M, as shown in FIG. 11. Accordingly, as the miter saw is beveled, shaft FSD will bend so as to drive blade 2 to allow a greater bevel angle range.

Persons skilled in the art should also note that it is preferable to minimize the overall width of the lower transmission LT, i.e., gears G/G2/G3 and/or belt B and/or rollers R1/R2, etc. By minimizing the width relative to a plane substantially parallel to blade 2 and/or the width relative to a plane substantially perpendicular to blade 2, the mitering capacity on the transmission side is maximized. In other words, as the saw assembly is rotated about an axis substantially perpendicular to the base plane 5P, i.e., the saw assembly is mitered, the wider lower transmission will contact the fence 7 before a thinner lower transmission, when both transmissions are at the same location.

Furthermore, it is also advantageous if the width of the lower transmission at its outermost point relative to the blade along the longitudinal axis of arbor A is smaller than the largest width of the lower transmission along the longitudinal axis of arbor A. As shown in FIG. 13, blade 2 is disposed on arbor A. Similarly, gear G is disposed on arbor A. Inner bearing 12A is disposed between gear G and blade 2. Outer bearing 12B is preferably disposed near the end of arbor A and preferably receives arbor protrusion AP. Persons skilled in the art will recognize that the outer diameter of the inner bearing 12A is preferably larger than the outer diameter of outer bearing 12B. Persons skilled in the art will also recognize the outer width OW is smaller than the largest width LW of the lower transmission LT along the longitudinal axis of arbor A.

As mentioned above, the width AW of the lower transmission LT along the arbor A should be minimized to maximize cutting capacity at right miter angles and/or right bevel angles. This is because the lower transmission LT is provided at the right of blade 2. As the saw assembly is mitered or beveled, the lower transmission LT approaches the fence 7 or the table 6, respectively.

Persons skilled in the art will recognize that the width AW along the longitudinal axis of arbor A is substantially the distance AD between blade 2 and the end of arbor A (or protrusion AP) plus the width TCOW of the outer wall TCO of transmission cover TC. Preferably, distance AD is substantially greater than width TCOW.

Persons skilled in the art will recognize that the width AW should be selected so that lower transmission LT remains within the envelopes MCE and/or BCE, to maximize the depth of cutting capacity planes MCL and/or BCL, respectively. Persons skilled in the art will note that efforts to maximize the cutting capacities should be directed at the cutting capacities affected by the width of lower transmission LT, as typically the cutting capacities on the other side of blade 2 will be automatically larger, since lower transmission LT would not contact a workpiece. In other words, lower transmission LT will not typically limit cutting capacity on the other side.

Preferably, the lower transmission LT does not extend outside of a miter envelope MCE, defined by the blade 2 and the miter capacity plane MCL, which is preferably substantially parallel to fence plane 7P. Miter capacity plane MCL is between about 0.75 inches and about 2.0 inches off fence plane 7P. Preferably, miter capacity plane MCL is about 0.90 inches off fence plane 7P. If lower transmission LT extends beyond a determined miter capacity plane MCL, the lower transmission will effectively move the capacity plane closer to fence plane 7P.

Figure 33:
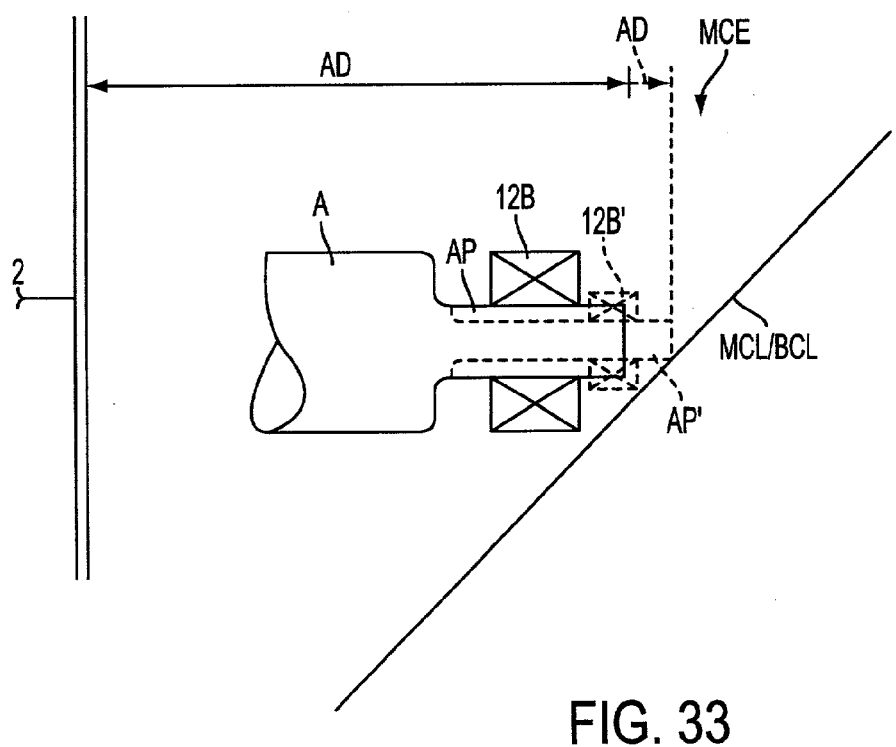
FIG. 33 is a partial cross-sectional view of the arbor assembly.

Referring to FIGS. 13 and 33, the distance AD can be related to the diameter of protrusion AP. For example, if protrusion AP is wide, its length will probably be shorter than a thinner protrusion AP' (shown in broken lines in FIG. 33). This is because of two possible reasons: (1) the thinner the protrusion, the longer it can be before crossing cutting plane MCL and/or BCL; or (2) the thicker protrusion AP, the thicker the bearing 12B available off-the-shelf.

For example, arbor A can have a distance AD of about 49.61 mm (with a width AW of about 51.78 mm) and a protrusion AP with an outer diameter of about 10 mm. In such case, the bearing 12B can be a standard 1010 bearing (with an inner diameter of 10 mm, and an outer diameter of about 14 mm). On the other hand, arbor A can have a distance AD' of about 51.61 mm (with a width AW of about 53.78 mm ) and a protrusion AP' with an outer diameter of about 6 mm. In such case, the bearing 12B' can be a standard 0609 bearing (with an inner diameter of about 6 mm and an outer diameter of about 10 mm). Persons skilled in the art should recognize that the two examples described above define the preferred ranges for distance AD and/or width AW.

Preferably, the lower transmission LT does not extend outside of a bevel envelope BCE, defined by the blade 2 and the bevel capacity plane BCL, which is preferably substantially parallel to base plane 5P and/or table plane 6P. Bevel capacity plane BCL is between about 1.6 inches and about one inch from base plane 5P and/or table plane 6P for a twelve-inch miter saw. Persons skilled in the art will recognize that this range is applicable to the side in which the lower transmission LT is.

Persons skilled in the art will recognize that the distance BCD between bevel capacity plane BCL and base plane 5P and/or table plane 6P will decrease as the bevel angle is increased and/or the distance ABP is decreased. Accordingly, the following table will show some preferred distances for a twelve-inch miter saw:

| Distance ABP (in cm) | Bevel Angle (side of lower transmission LT) | Preferred Distance BCD (in inches) |
| --- | --- | --- |
| ~11.62 | ~45° | ~1.60 |
| ~11.62 | ~48° | ~1.36 |
| ~10.27 | ~45° | ~1.22 |
| ~10.27 | ~48° | ~1.00 |

Persons skilled in the art should recognize other methodologies can be used for increasing the right miter cutting capacity and/or right bevel cutting capacity. For example, the center plane 2CP of blade 2 typically bisects upper blade guard 4. It is preferable however to shift blade guard 4 (and lower transmission LT) towards the side away from lower transmission LT (i.e., leftwardly in FIG. 29). Accordingly, blade 2 will lay rightwardly between the center plane 4C of upper blade guard 4 and the wall 4W of upper blade guard 4 closest to lower transmission LT.

Typically, the gears in miter saws are disposed outside of upper blade guard 4. However, it is preferable to move lower transmission LT into upper blade guard 4. Accordingly, a plane 4WP substantially coplanar with wall 4W may intersect lower transmission LT, and preferably intersects components in lower transmission LT other than arbor A.

Figure 31:
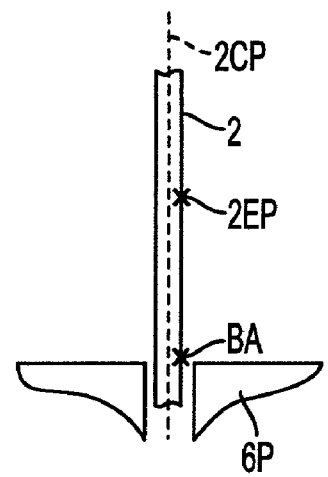
FIG. 31 is a partial front elevational view.

Referring to FIG. 31, it is preferable to dispose bevel axis BA along the edge plane 2EP of blade 2 closest to lower transmission LT. Alternatively, bevel axis BA may be disposed outside of any planes coplanar and within blade 2. In such arrangement, bevel axis BA is preferably disposed outside of blade 2 on the side of the lower transmission LT.

Figure 32:
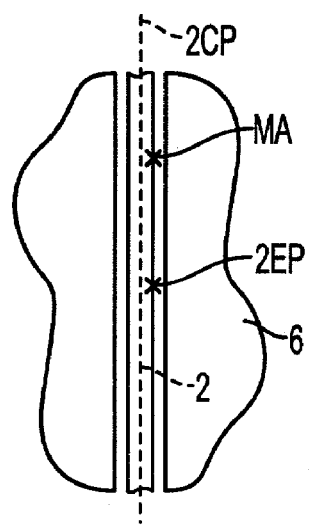
FIG. 32 is a partial cross-sectional view along line Y-Y of FIG. 7.

Referring to FIG. 32, it is preferable to dispose miter axis MA along the edge plane 2EP of blade 2 closest to lower transmission LT. Alternatively, miter axis MA may be disposed outside of any planes coplanar and within blade 2. In such arrangement, miter axis MA is preferably disposed outside of blade 2 on the side of lower transmission LT.

Figure 29:
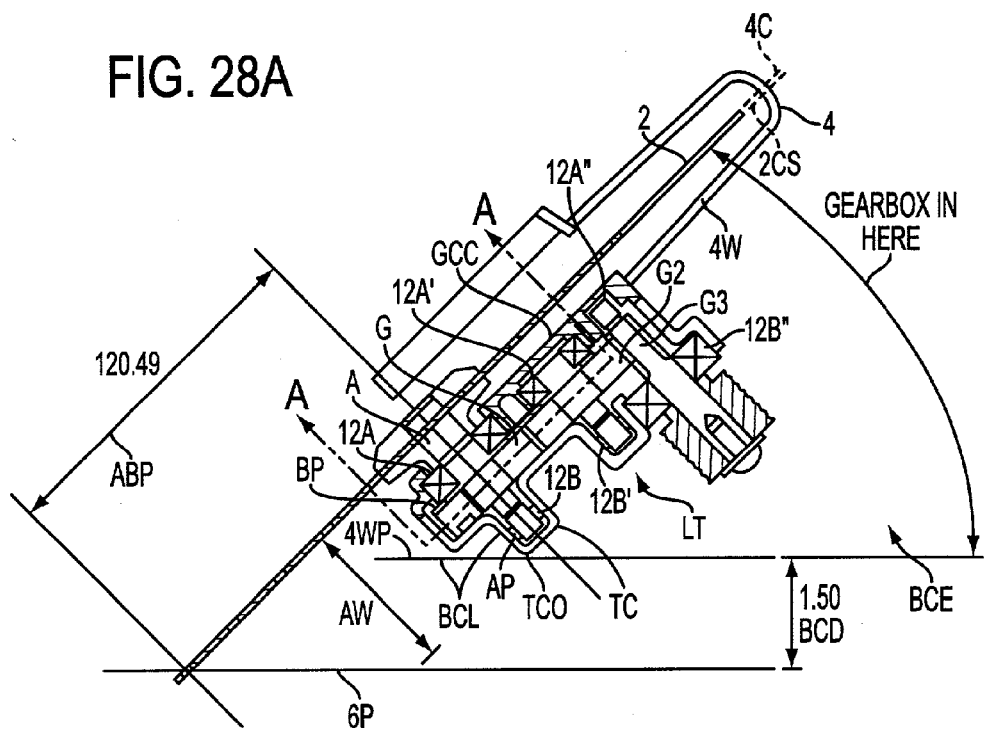
FIG. 29 is a partial cross-sectional view along line X-X of FIG. 7.

Referring to FIGS. 13 and 29, arbor A is supported by inner bearings 12A and outer bearings 12B. Inner bearings 12A', 12A" and outer bearings 12B', 12B" preferably support the shafts of gears G2, G3, respectively, in a manner similar to bearings 12A, 12B and arbor A.

Typically, the inner bearings 12A are separated from gear G by a screw disposed therebetween. It is, however, preferable to dispose a bearing plate BP between inner bearings 12A, 12A' and gears G, G2. Inner bearings 12A, 12A' will thus be retained between bearing plate BP and gearcase cover GCC. Because bearing plate BP is preferably thinner than the prior art screw, the lower transmission (LT) width is decreased.

Figure 30:
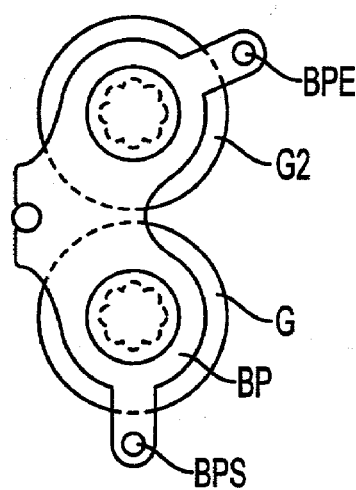
FIG. 30 is a partial side view along line A-A of FIG. 29.

Bearing plate BP may have ears BPE, as shown in FIG. 30. Screws BPS can then be screwed onto gearcase cover GCC and/or wall 4W. By disposing screws outside of the bearings 12A, 12A' and gears G, G2, the distance between the bearings and gears is decreased, again decreasing the width of lower transmission.

Figure 29A:
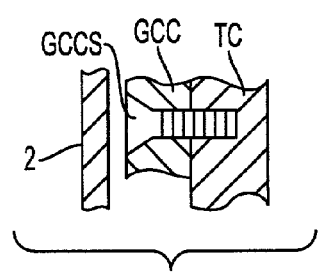
FIG. 29A being a close-up view of a portion of FIG. 29.

Gearcase cover GCC may be screwed onto transmission cover TC with countersunk screws GCCS, as shown in FIG. 29A. It is preferable to use countersunk screws, rather than screws that would protrude from gearcase cover GCC, in order to place blade 2 closer to gearcase cover GCC. Alternatively, counterbore screws or screws with thin heads may be used. Such arrangement would further decrease the width of lower transmission LT.

With an arrangement as defined above, a twelve-inch double compound miter saw will be able to cut, e.g., a six-inch baseboard molding laid vertically against fence 7 at 0° bevel angle and miter angle, a nominal four-by-four at any miter angle (between 50° and −50°), a nominal four-by-six laid flat on table 6 at 0° bevel angle and miter angle, a nominal two-by-six laid flat on table 6 at any miter angle between about 45° and −45° and a bevel angle between about 45° and about −45°, and a nominal two-by-eight laid flat on table 6 at a 0° miter angle and a bevel angle between about 45° and about −45°.

Furthermore, in the preferred embodiment, the maximum cutting capacity is as follows:

| Miter Angle | Bevel Angle | Cutting Width (in inches) | Cutting Height (in inches) |
|---|---|---|---|
| 0° | 0° | ~7.9 (maximum) | ~2.9 (at max. width) |
| 0° | 0° | ~7.4 (at max. height) | ~3.5 (maximum) |
| 0° | ~Right 45° | ~7.9 (maximum) | ~1.2 (at max. width) |
| 0° | ~Right 45° | ~7.4 (at max. height) | ~1.6 (maximum) |
| 0° | ~Left 45° | ~7.9 (maximum) | ~1.9 (at max. width) |
| 0° | ~Left 45° | ~7.4 (at max. height) | ~2.3 (maximum) |
| ~Right 45° | 0° | ~5.6 (maximum) | ~2.9 (at max. width) |
| ~Right 45° | 0° | ~5.3 (at max. height) | ~3.5 (maximum) |
| ~Left 45° | 0° | ~5.5 (maximum) | ~2.9 (at max. width) |
| ~Left 45° | 0° | ~5.2 (at max. height) | ~3.5 (maximum) |

Also, in the preferred embodiment, the maximum cutting capacity for a baseboard placed vertically against fence 7 is as follows:

| Miter Angle | Bevel Angle | Cutting Width (in inches) | Cutting Height (in inches) |
|---|---|---|---|
| ~Right 45° | 0° | ~0.9 | ~6.0 |
| 0° | 0° | ~2.0 | ~6.0 |
| ~Left 45° | 0° | ~1.1 | ~6.0 |

Persons skilled in the art should note that the maximum cutting capacities increase if the crown molding is shorter, e.g., 5.5 inches.

Figure 12:
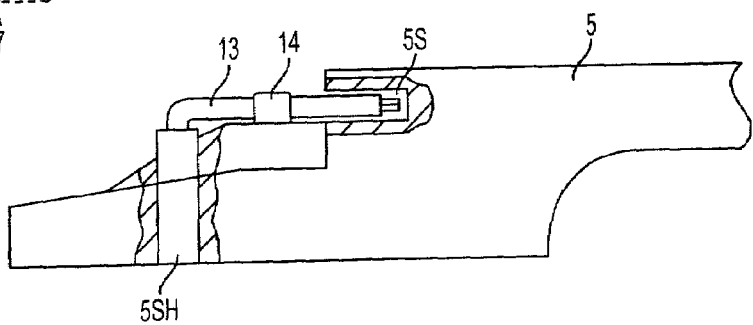
FIG. 12 is a partial cross-sectional side view of a base wrench storage.

Referring to FIG. 12, base assembly 5 may have a spring clip 14 for holding a wrench 13 in place. Preferably, base assembly 5 has a space 5S for accepting the wrench 13 therein. Base assembly 5 may also have a hole 5SH for receiving wrench 13. Preferably, hole 5SH completely extends through base 5, allowing dust to fall therethrough.

Referring to FIG. 14, wear system 30 may be disposed between base assembly 5 and table 6 to improve rotation thereof. Wear system 30 preferably includes at least one wear strip 31, which may be made of plastic, steel, or any other material that will facilitate rotation of table 6 and minimize binding between table 6 and base assembly 5. In the preferred embodiment, there are three wear strips 31 that are bolted onto base assembly 5 via screws 32 that extend through holes 32H in the wear strips 31. To facilitate assembly, it is preferable to provide on the wear strip 31 a small boss hole 5SBH and a large boss hole 5LBH to receive corresponding small boss 5SB and large boss 5LB therethrough. By providing such small and large boss holes, the assembler is prevented from rotating the wear strip 180° and installing the wear strip thereon. Accordingly, only one side of the wear strip needs to have the lower friction coating, treatment, etc.

Persons skilled in the art shall recognize that the bosses may be provided on wear strip of 31 while the holes may be provided on base assembly 5. Persons skilled in the art should also recognize that the wear strip 31 may be screwed onto table 6, instead of into base assembly 5. Similarly, the bosses may be disposed on one of the wear strip 31 and table 6 while the corresponding holes may be disposed on the other of table 6 and wear strip 31.

Persons of ordinary skill in the arts should also recognize that one boss may be disposed on one of the wear strip 31, base assembly 5 and table 6, while the other boss may be disposed on the other of the wear strip 31, base assembly 5 and table 6.

Figure 15A:
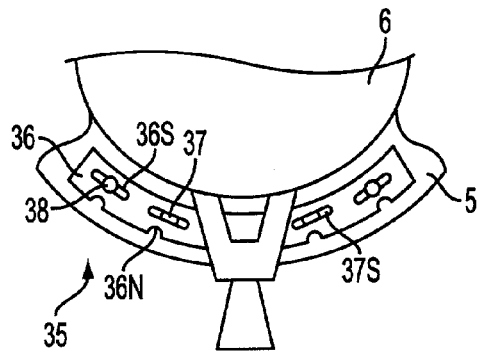
FIGS. 15A-15B illustrate alternate miter detent assemblies according to the invention.

Referring to FIG. 15A, a miter detent mechanism may be provided on miter saw 1 as is well-known in the art. The detent scale plate 36 may be bolted onto base assembly 5 via screws 38 extending therethrough. Scale 36 may have detent notches 36N for receiving detent spring (not shown).

Figure 15B:
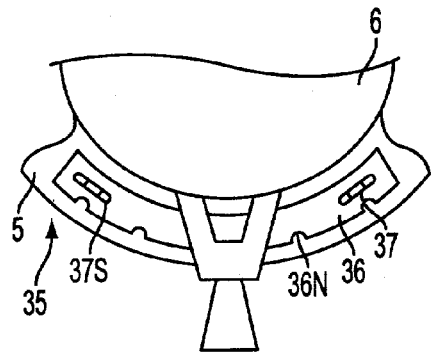

Scale 36 may have slots 36S for receiving screws 38 allowing for adjustment of scale 36. Scale 36 may also have slots 37S for receiving a boss 37 which is fixedly connected to base assembly 5. Such boss 37 is preferably elongated and matches the contours of slot 37S. Accordingly, as the scale 36 is slid along for adjustment, boss 37 keeps the scale 36 substantially aligned. Persons skilled in the art should also recognize that boss 37 may also have tapped holes for threadedly receiving screws 38 therethrough, as shown in FIG. 15B, obviating the need for separate screws slots 36S. Persons skilled in the art should also recognize that screws 38 may have a shoulder to engage slots 36S in a similar way.

Figure 16:
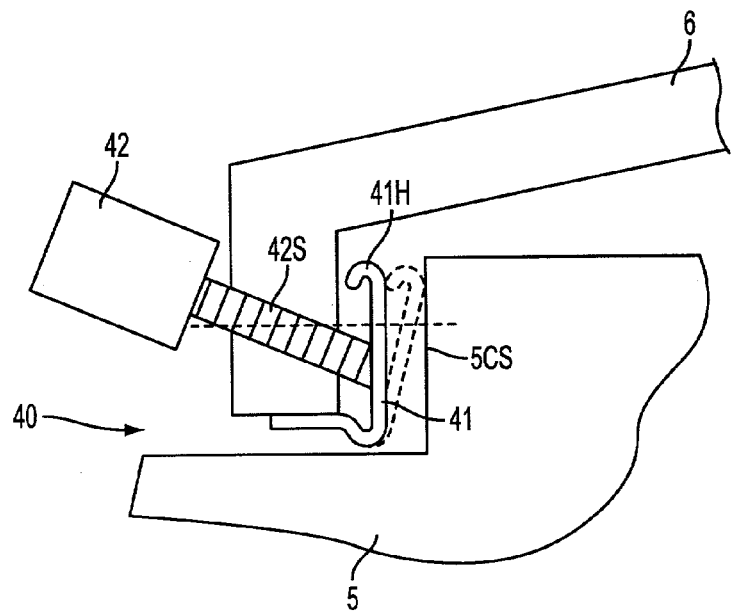
FIG. 16 shows an embodiment of a miter lock assembly.

FIG. 16 illustrates an embodiment of a miter lock assembly 40. Miter lock assembly 40 comprises spring 41 disposed between table 6 and base assembly 5, a knob 42 connected to a screw 42S, which contacts spring 41. In order to lock table 6 in the desired miter position, the user needs to rotate knob 42 (and thus screw 42S), compressing spring 41 into contact with contact surface 5CS of base assembly 5. In the prior art, the longitudinal axis of screw 42S was perpendicular to contact surface 5CS. However, it has been found that it is preferable to dispose screw 42S so that its longitudinal axis is inclined relative to such perpendicular line. Accordingly with such arrangement, the amount of play and/or vertical movement of table 6 is minimized as knob 42 is rotated.

It is preferable to provide a hook 41H at the end of spring 41 to provide a stop to prevent screw 42S from substantially moving upwardly along spring 41 and/or contact surface 5CS.

Figure 17A:
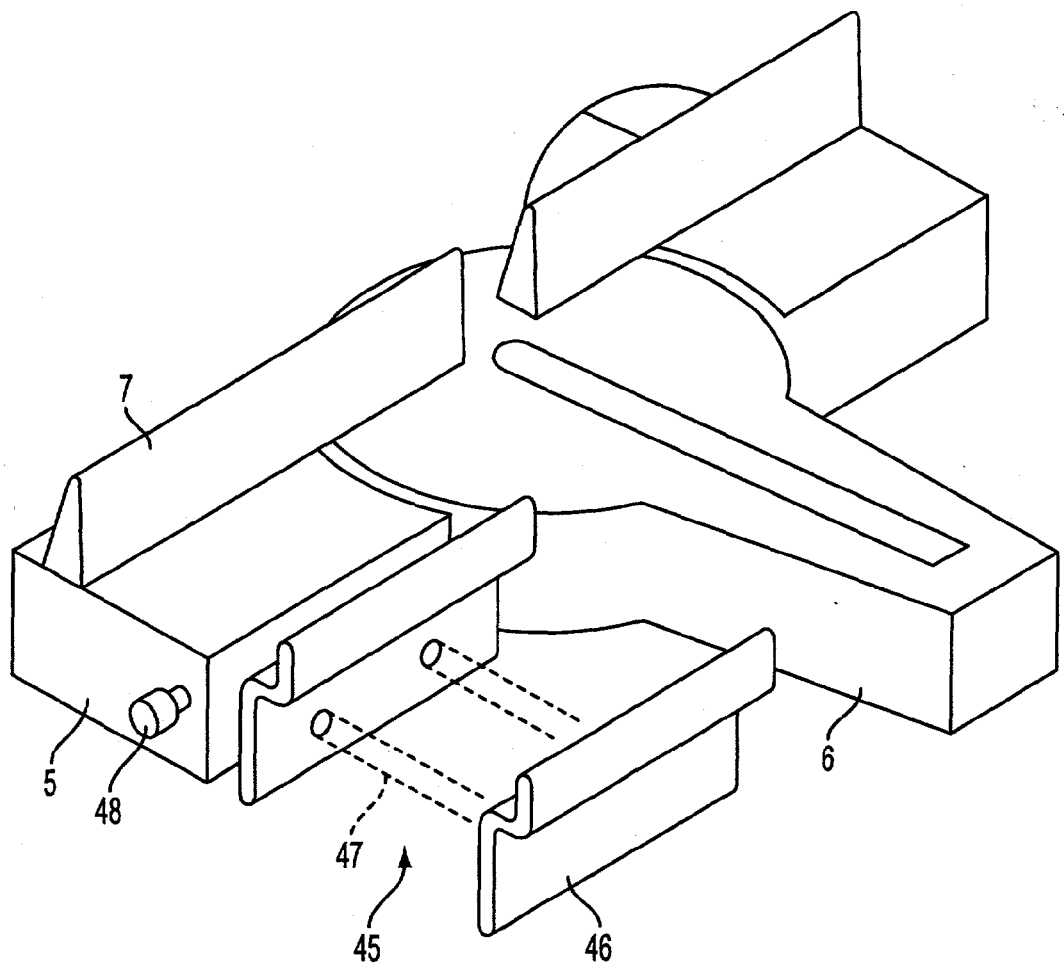
FIGS. 17A and 17B are perspective and side elevational views, respectively.
Figure 17B:
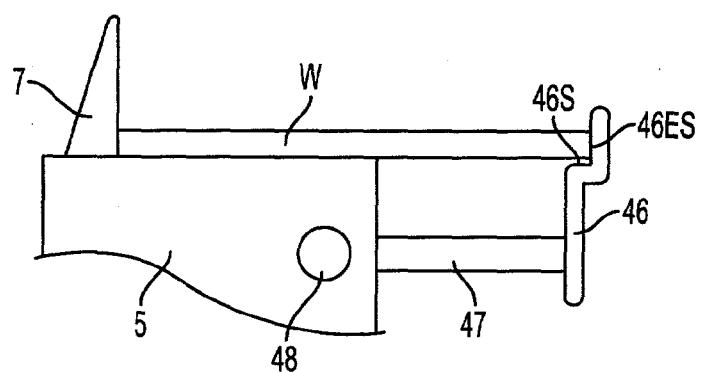

It may be advantageous to provide an additional workpiece support assembly in addition to the base assembly 5 and rotatable table 6. FIG. 17 shows a first embodiment of such workpiece support assembly 45. Workpiece support assembly 45 may include support 46 connected to at least one rod 47, which is slidably received in base assembly 5. The position of rod 47 (and thus support 46) can be fixed by rotating screw knob 48, which contacts rod 47. Support 46 may have a substantially horizontal support surface 46S for supporting workpiece W as well as substantially vertical support service 46ES.

Persons skilled in the art will recognize that, in order to support a workpiece, the support 46 is moved inwardly or outwardly as needed so that workpiece W is supported by support surface 46S as well as base assembly 5. For added rigidity, the user can move support 46 so that the workpiece W is pinched between fence 7 and support surface 46ES. Persons skilled in the art will also recognize that if the user does not need the support provided by workpiece support assembly 45, the user can remove such assembly or move the support 46 outwardly so that no additional support is provided.

Persons skilled in the art will also recognize that the support 46 may be moved outwardly in a direction substantially perpendicular to the plane of fence 7. However, it may be preferable to arrange rail 47 within base assembly 5 so that it slides along an inclined direction relative to the plane of fence 7 (as shown in FIG. 18). Allowing the user to move the support 46 along an inclined direction will prevent contact between support 46 and table 6 when rotated.

Figure 1:
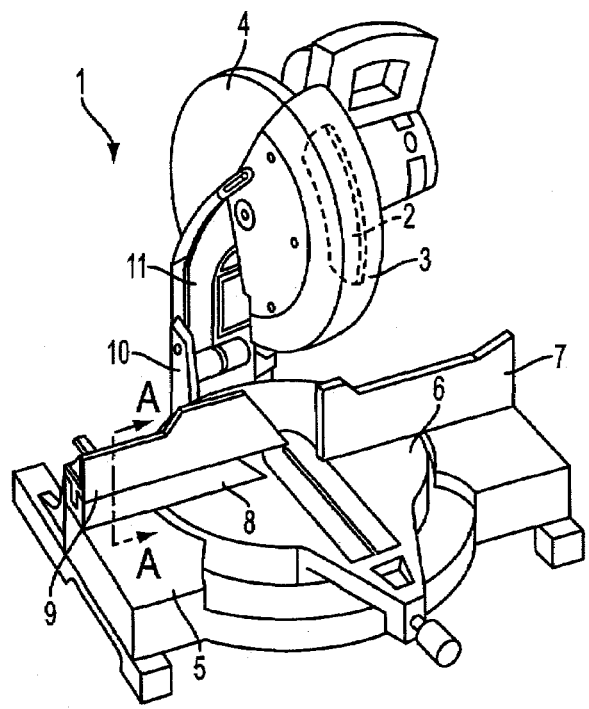
FIG. 1 is a perspective view of a prior art miter saw.
Figure 2:
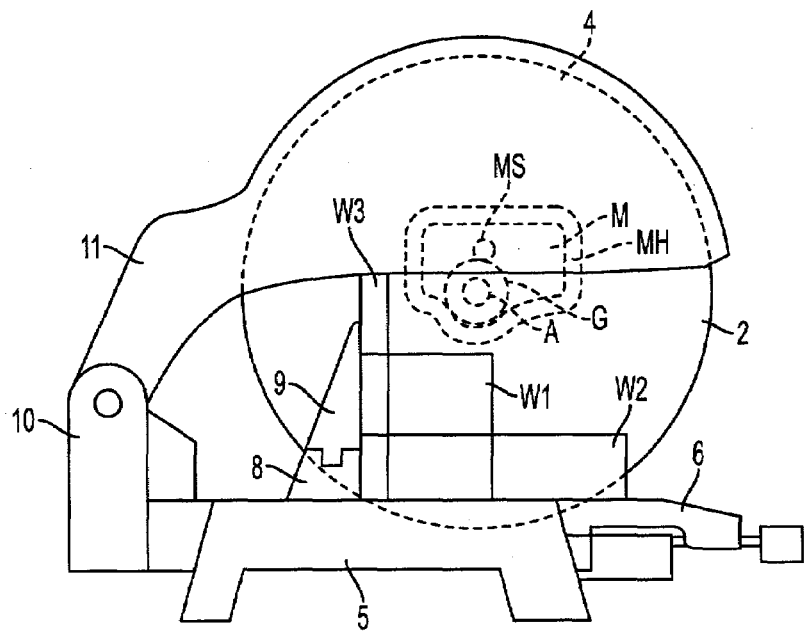
FIG. 2 is a side elevational view of the prior art miter saw of FIG. 1 during a cutting operation.
Figure 3:
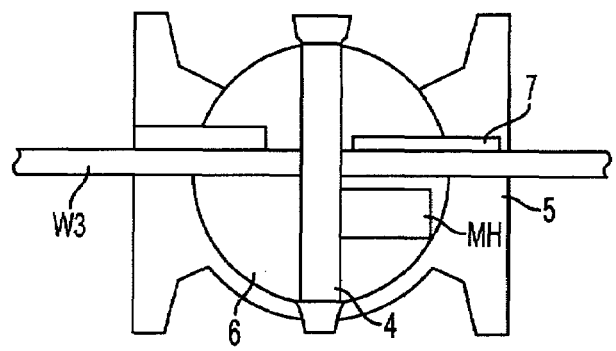
FIG. 3 is a top plan view of the prior art miter saw of FIG. 2 disposed at a miter angle of 0°.
Figure 4:
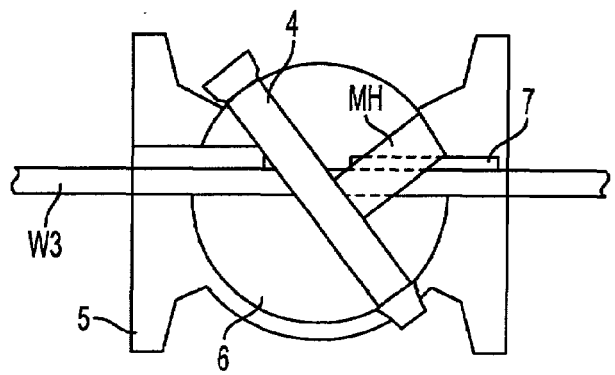
FIG. 4 is a top plan view of the prior art miter saw of FIG. 2 mitered rightwardly.
Figure 5:
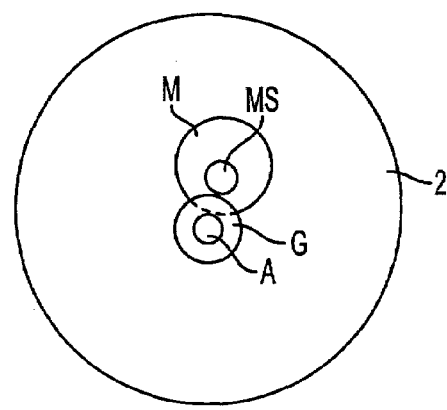
FIG. 5 is a partial view of a prior art motor/blade assembly.
Figure 19B:
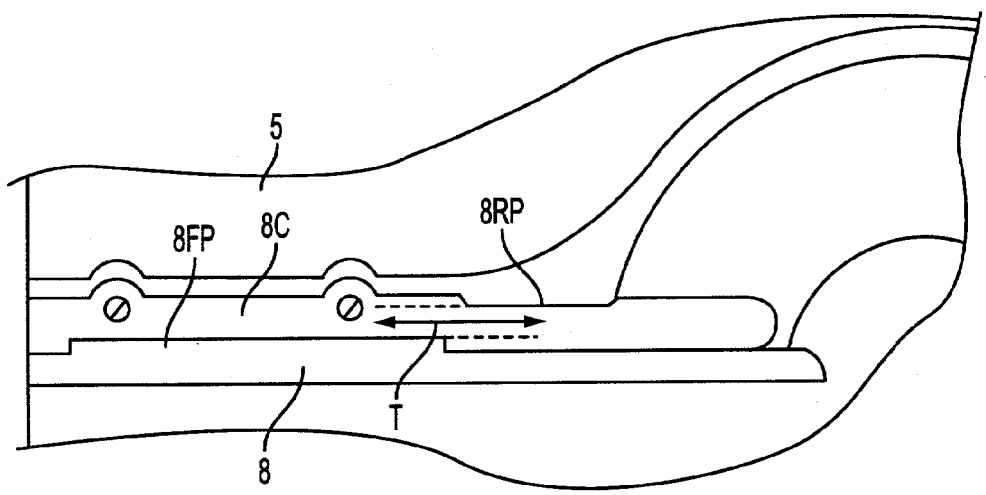
FIG. 19B is a cross-sectional view along line B-B of FIG. 19A.

Referring to FIG. 1, the prior art shows a sliding fence assembly with a fixed fence 8 being fixedly attached to base assembly 5 and a sliding fence 9 sliding thereon. As mentioned above, it is preferable that both fixed and sliding fences 8 and 9 are substantially coplanar. An improved sliding fence assembly is shown in FIG. 19. As shown in FIG. 19A, the fixed fence 8 has a channel 8C slidingly receiving sliding fence 9. The position of sliding fence 9 can be fixed relative to fixed fence 8 by turning a screw 8B.

It is preferable that the front face 8ACF be undercut. In other words, instead of face 8CF being substantially perpendicular to the base plane 5P, it is preferred that the face 8CFB be inclined relative to base plane 5P. By having an undercut face, if the user overtightens screw 8B, the sliding fence 9 will still be substantially coplanar to fixed fence 8. The amount of undercut does not have to be substantial. In the preferred embodiment, the inclined face 8CF can be defined by its vertical and horizontal components. The vertical component V, i.e., the height of fence face 8CF is about 16 mm, whereas the horizontal component of face 8CF, i.e., the width H, can be about 0.0015 inches.

In order to maintain a sliding fence 9 substantially coplanar to fixed fence 8, it is also preferable to provide fixed fence 8 with a rear pad 8RP and a front pad 8FP along the travel line T of sliding fence 9 to minimize the amount of play between sliding fence 9 and fixed fence 8. Persons skilled in the art should recognize that the pads are protrusions extending inwardly into channel 8C. Preferably these protrusions are substantially wide so as to maximize the contact between the sliding fence 9 and the pads. Persons skilled in the art should also recognize that the pads may be provided on the sliding fence 9 instead, or in both the sliding fence 9 and the fixed fence 8.

Referring to FIG. 20, it may be preferable to provide a removable sliding fence. The previous discussions on the sliding fences and all the teachings are hereby referred to and incorporated, where like numerals refer to like parts. As discussed above, fixed fence 8 has a channel 8C defined by a front portion 8F and a rear portion 8R. Sliding fence 9 is disposed within channel 8C. Preferably, the front portion 8F is coplanar with sliding fence 9. A groove 8G may be provided in front portion 8F to slideably receive a bolt head 9BH disposed on the sliding fence 9. The bolt head 9BH is connected to a bolt 9B, which may extend through a horizontal in slot (not shown) in sliding fence 9 and is threadedly engaged to knob 9BK. Accordingly, when sliding fence 9 is disposed in channel 8C, the groove 8G receives bolt head 9BH. The user can then lock the sliding fence 9 by rotating knob 9BK, drawing sliding fence 9 towards front portion 8F. A person skilled in the art should recognize that fixed fence 8 may be provided with a notch 8N to match the shape of the bolt head 9BH to assist in this locking operation. Preferably, the bolt head 9BH is hexagonal, and notch 8N substantially matches such shape.

Front portion 8F may have an anti-wobble tongue 8P which engages an anti-wobble groove 9G disposed on sliding fence 9. Similarly, rear portion 8R may have a support 8TS for contacting the sliding fence 9. The tongue 8T and support 8TS may be offset as discussed above. Persons skilled in the art should recognize that the tongue and support are the pads mentioned above.

Figure 22A:
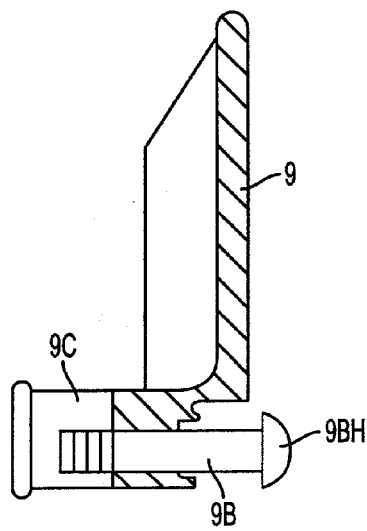
FIGS. 22A and 22B are side cross-sectional and top plan views, respectively.
Figure 22B:
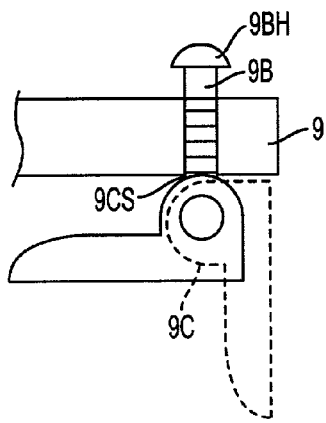

Persons skilled in the art should recognize that knob 9BK may be replaced with cam 9C as shown in FIG. 22 so that the user is not required to make multiple turns of knob 9BK. Instead, bolt 9B is pivotally attached to cam 9C, which contacts cam surface 9CS. Upon rotation of cam 9C, bolt head 9BH will move closer towards sliding fence 9, thus pinching groove 8G and locking the sliding fence in place.

Figure 21C:
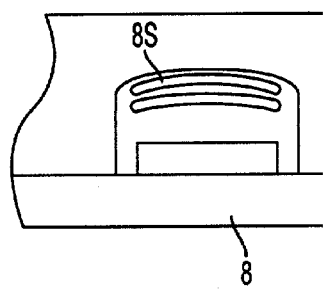
FIG. 21C is a rear elevational view along line A-A of FIG. 21A.
Figure 21A:
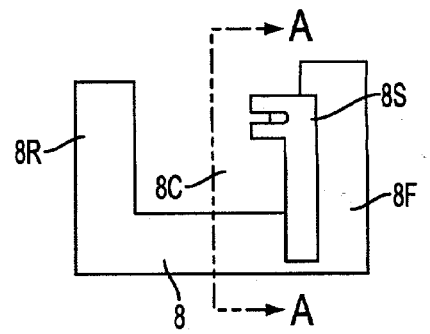
FIGS. 21A and 21B are side elevational view of the fence assembly with a removable fence removed and installed, respectively.
Figure 21B:
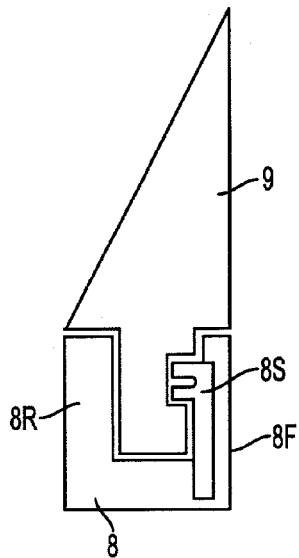

It may also be preferable to provide a rattle stop in the sliding fence arrangements discussed above. FIG. 21 shows such a rattle stop arrangement, where like numerals refer to like parts. It may be preferable to provide fixed fence 8 with a spring 8S within channel 8C. Spring 8S may be a leaf spring made of metal or plastic. Spring 8S may be disposed next to the front portion 8F or the rear portion 8R. Spring 8S will push sliding fence 9 against the opposite face of channel 8C, thus substantially removing rattles. Persons of ordinary skill in the art should also recognize that spring 8S may be provided on sliding fence 9 in addition to, or instead of, spring 8S provided in channel 8C.

Figure 23A:
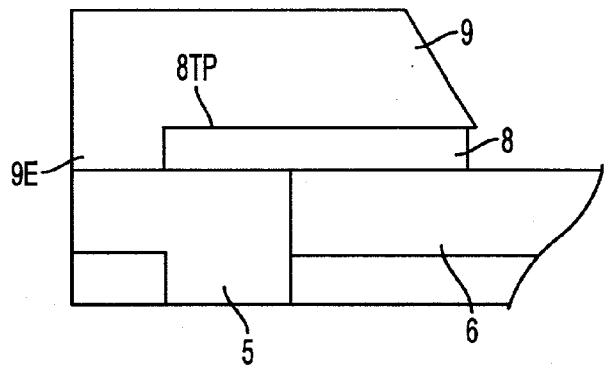
FIGS. 23A and 23B are front elevational views in two different fence positions, respectively.
Figure 23B:
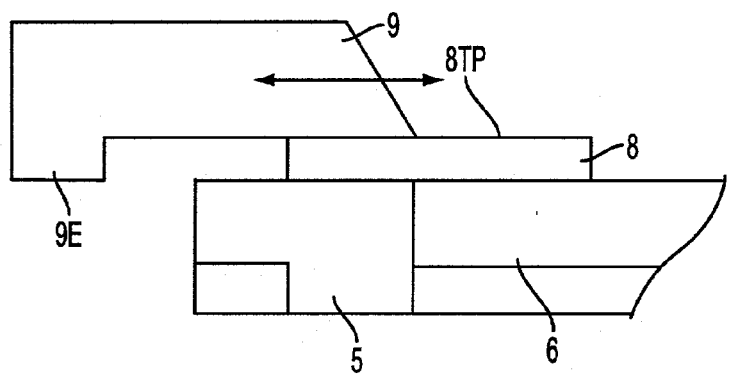
Figure 23C:
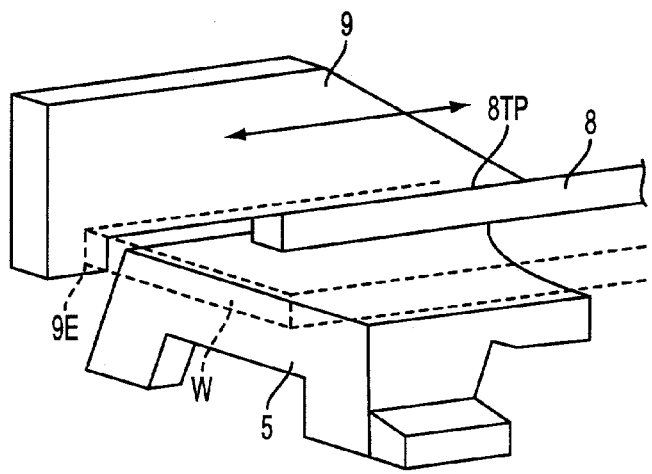
FIG. 23C is a perspective view of the sliding fence in the fence position of FIG. 23B.
Figure 24:
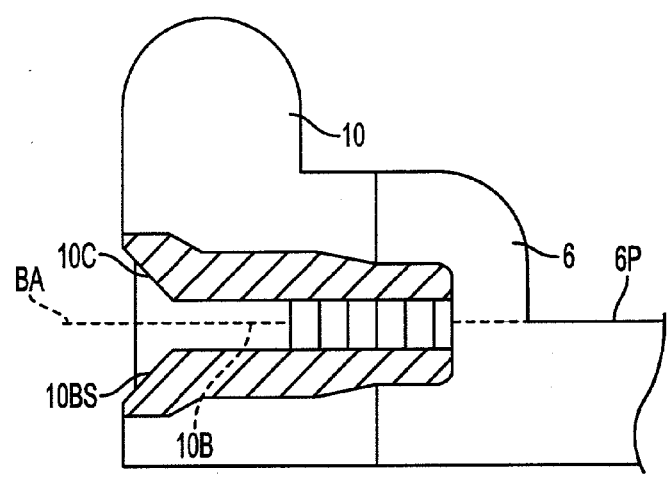
FIG. 24 shows an embodiment of a bevel pivoting junction.

Referring to FIG. 23, it may be preferable to provide sliding fence with an extension 9E which extends below the highest point 8PP of fixed fence 8. Extension 9E is preferably disposed at the outermost, i.e., the portion farthest away from blade 2, edge of sliding fence 9. Accordingly, sliding fence 9 can be moved outwardly to provide further support to a workpiece W as shown in FIG. 23C.

As mentioned before, pivot junction 10 is pivotally connected to table 6. Pivot junction 10 is attached to table 6 via screw 10B. Pivot junction 10 rotates about screw 10B. Persons skilled in the art will recognize that the longitudinal axis of screw 10B is the bevel axis BA. Preferably, the longitudinal axis (and thus the bevel axis) is substantially coplanar with base plane 5P.

Screw 10B may have an inclined surface 10BS which forms a tapered or conical structure contacting inclined surface 10C of pivot junction 10. Accordingly, after screw 10B is tightened, the pivot block 10 is moved closer to table 6. Such arrangement is advantageous as the contacting conical structure 10BS and 10C limit the play found in typical prior art miter saws.

Figure 25:
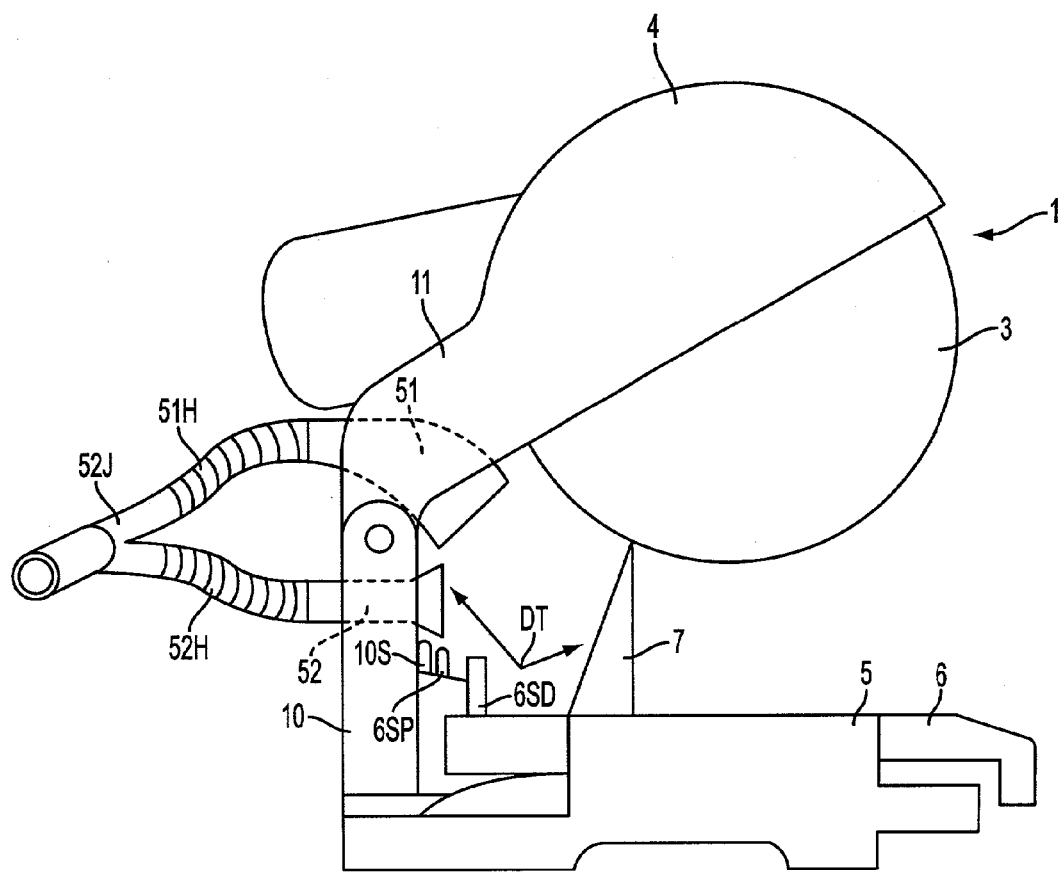
FIG. 25 is a side elevational view of a miter saw with a dust collection system.

Referring to FIG. 25, miter saw 1 may also have an improved dust collection system. The dust collection in miter saw 1 may include a dust collector 51 disposed in pivot arm 11. Persons skilled in the art are hereby referred to U.S. Pat. No. 5,819,619, which is wholly incorporated by reference herein. In addition to the dust collector 51, it is also preferable to provide dust collector 52 on pivot junction 10. Preferably dust collector 52 extends through pivot junction 10. Dust collector 52 may be connected to a hose 52H, which in turn may be connected to a junction 52J which also receives the dust output of dust collector 51 via hose 51H.

Figure 26A:
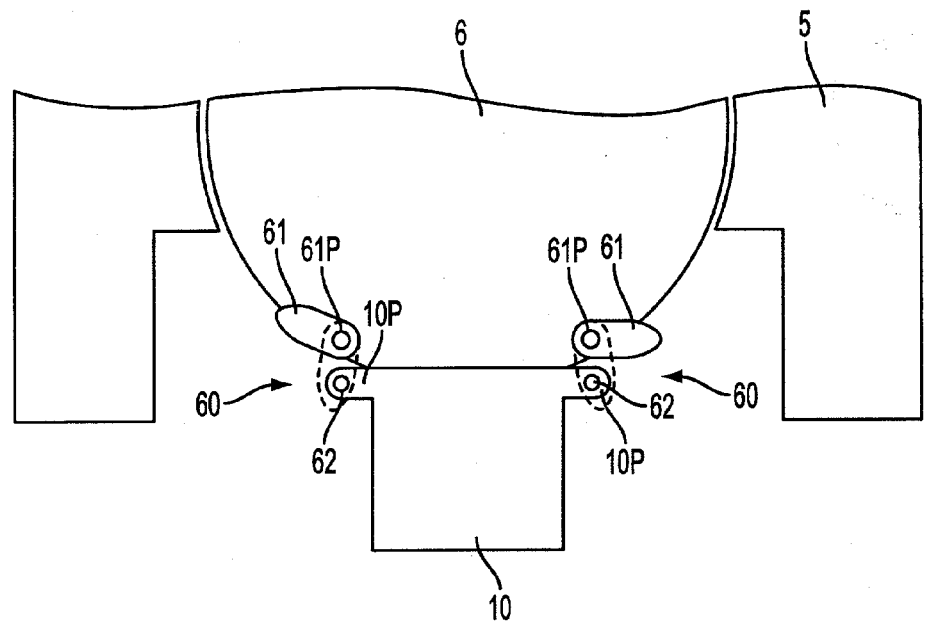
FIG. 26A is a top plan view and FIG. 26B is a partial rear view.
Figure 26B:
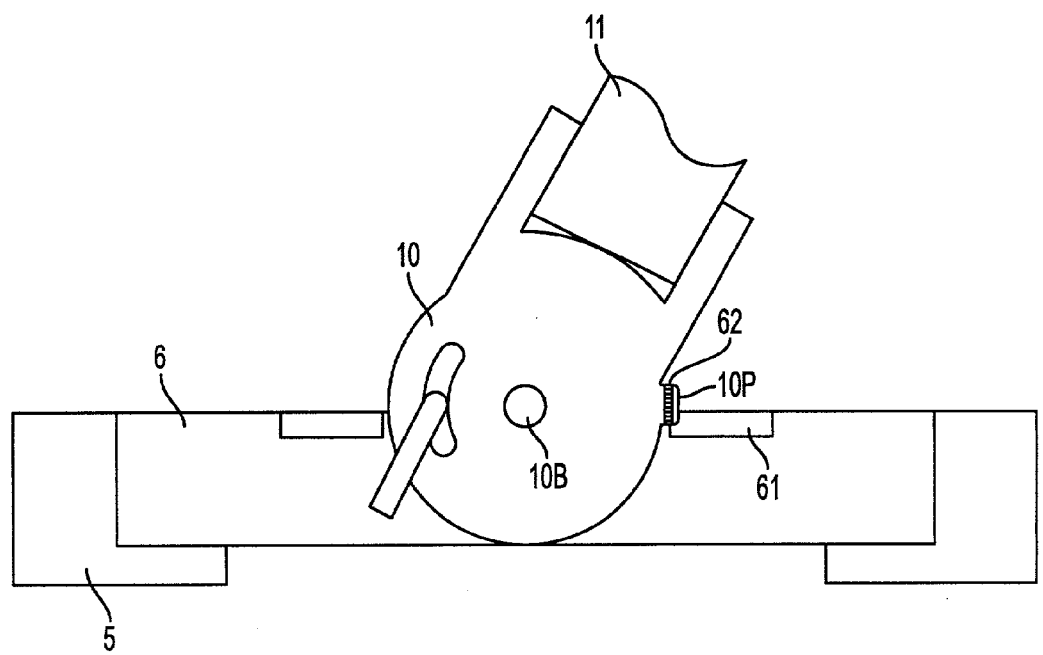

It is preferable to provide different bevel stops at commonly used bevel angles. One such bevel stop mechanism 60 is shown in FIG. 26. The bevel stop mechanism 60 may include pawl 61 pivotally attached to table 6 via pivot pin 61P. Pivot junction 10 may have a protrusion 10P. If the user pivots pawl 61 about pin 61P towards pivot junction 10, pivot junction 10 will contact pawl 61 and stop rotating about the bevel axis. In order to allow the user to move the pivot junction 10 (and thus blade 2) beyond the pawl 61, the user need only rotate pawl 61 towards table 6 and to allow pivot junction 10 to rotate beyond the previous bevel angle location. Persons of ordinary skill in the art will recognize that screw 62 may be disposed in protrusion 10P for contacting pawl 61. Providing a screw 62 would allow the user to adjust the bevel stop angle.

Persons of ordinary skill in the art will also recognize that the pawl 61 is preferably pivotable about an axis substantially perpendicular to table 6. However, persons skilled in the art should also recognize that the same result will be achieved if pawl 61 is slideably attached to the table 6 and is moveable for contact with pivot junction 10. It has been found that this bevel stop mechanism is very user friendly.

Preferably this bevel stop mechanism 60 is "programmed" so that the protrusion 10P and/or screw 62 will contact pawl 61 at a bevel angle of 33.85 degrees. Persons skilled in the art should also recognize that the bevel stop mechanism 60 can be placed both left and right of blade 2 in a miter saw that bevels leftwardly and rightwardly. Persons skilled in the art should recognize that pawl 61 may be disposed on pivot junction 10 for contacting a protrusion or screw disposed on table 6.

A second bevel stop mechanism 65 is shown in FIG. 27, where like numerals refer to like parts. All the teachings from the previous embodiments are incorporated herein by reference. Pivot junction 10 may have a protrusion 10PP that carries bevel stop plate 66, which is slidingly connected thereto via screw 69. Plate 66 may be moved towards and away from table 6. Table 6 may have a protrusion 67 for contacting plate 66. Protrusion 67 may also carry screw 68 for contacting plate 66. Persons skilled in the art should recognize that bevel stop mechanism 65 may be disposed on the right and left side of the blade 2 if the miter saw is a double compound miter saw, i.e., it bevels both leftwardly and rightwardly.

Preferably, bevel stop mechanism 65 can be used to limit the range of bevel angles. Typically, such range is between about 45 degrees and about –45 degrees. Accordingly, if a user wants to bevel the saw to 45 degrees, the user need only move plate 66 towards table 6 and bevel pivot junction 10 (and thus blade 2) until plate 66 contacts protrusion 67 or screw 68. If the user then wants to move beyond 45 degrees, the user need only move plate 66 away from table 6 and rotate pivot junction 10 further. Protrusion 67 and/or screw 68 will then contact protrusion 10PP. Preferably, protrusion 10PP has been designed so that the point of contact between protrusion 10PP and protrusion 67 and/or screw 68 will be about 48 degrees.

Persons skilled in the art should also recognize that bent plate 66 can be used with the protrusions 67 and/or screws 68 on both sides of blade 2, as shown in FIG. 27. Accordingly, only one plate 66 is required. Persons skilled in the art should also recognize that a handle 66H may be provided on plate 66 to facilitate the user movement of plate 66.

Persons skilled in the art should also recognize that it may be desirable to divide plate 66 into two plates, one for each side, for contacting protrusion 67 and/or screw 68 separately. Such arrangement will allow the user to bevel the blade to 48 degrees rightwardly and 45 degrees leftwardly, for example, without any adjustment.

Persons skilled in the art should also recognize that providing screw 68 will allow the user to adjust the preferred bevel angle stop.

Persons skilled in the art should recognize that both bevel stop mechanism 60 and 65 may be provided in a saw simultaneously to provide the user with different bevel stop alternatives.

Preferably, a scale 10S and a pointer 6SP are provided on trunnion 10 and table 6, respectively, as shown in FIG. 25. Accordingly, as the saw assembly (and thus trunnion 10) is rotated, the scale 10S will move. The user can then determine the bevel angle by locking at the point 6SP and scale 10S.

It is preferable to minimize the amount of dust landing on scale 10S. Accordingly, a dust deflector 6SD may be disposed on table 6. Preferably, deflector 6SD is a wall extending upwardly from table 6. Deflector 6SD may be disposed between scale 10S and/or pointer 6SP, and fence 7. Preferably, deflector 6SD is high enough to block dust moving directly towards scale 10S. Accordingly, dust moving along trajectory DT will bounce off deflector 6Sd and avoid landing on scale 10S.

Figure 28B:
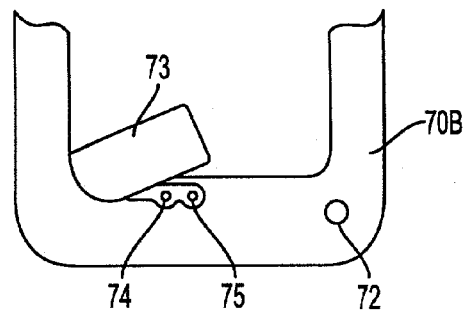
FIG. 28B is a partial cross-sectional view along line A-A of FIG. 28A.

FIG. 28 illustrates an improved handle 70 according to the invention. Handle 70 comprises top clamshell 70T, bottom clamshell 70B, and screws 71A and 71B for attaching top clamshell 70T to bottom clamshell 70B. In addition, handle 70 has a switch 73 disposed between top and bottom clamshells 70T, 70B. Typically, switch 73 is affixed to bottom clamshell 70B via two screws in addition to screws 71A, 71B. However, it is preferable to minimize the number of screws needed to assembly handle 70B.

Accordingly, it is preferable to provide bottom clamshell 70B with at least three taps. Tap 72 may threadingly receive screw 71B, while tap 75 may threadingly receive a first switch-fixing screw (not shown). Tap 74 preferably threadingly receives screw 71A.

To assemble handle 70, the assembler would dispose switch 73 on bottom clamshell 70B. Then the assembler would dispose the first switch-fixing screw through switch 73 and thread it into tap 75. The assembler then disposes top clamshell 70T on bottom clamshell 70B. The assembler then extends screw 71B through top clamshell 70T and threads it into tap 72. Finally, the assembler extends screw 71A through top clamshell 70T and switch 73 and threads it into tap 74.

Persons skilled in the art may recognize other alternatives or additions to the means disclosed herein. However, all these additions and/or alterations are considered to be equivalents of the present invention.

What is claimed is:

1. A miter saw comprising:
   a base assembly;
   a rotatable table rotatably connected to the base assembly and having a table plane;
   a saw assembly pivotable about a chopping axis, the saw assembly including a motor with a motor shaft, and a blade having a radius and being disposed on an arbor, the arbor having a first portion carrying the blade, a second portion disposed away from the blade, and a first gear disposed on the second portion, an intermediate gear meshing with the first gear, and a second gear driven by the motor and meshing with the intermediate gear, wherein the intermediate gear is always meshing with the first and second gears, the second gear being driven by the motor via a belt and being above a line drawn between the motor shaft and the arbor; and
   a pivot arm pivotally attached to the table and supporting the saw assembly, the pivot arm and saw assembly being pivotable about a horizontal bevel axis from a first position where the blade is substantially perpendicular to the table to a second position where the blade is disposed at an angle relative to the table, the angle between the blade and the table being about 45 degrees;
   wherein a distance between the second portion and at least one of the base assembly and the table is smaller than a distance between the first portion and the at least one of the base assembly and the table when the saw assembly is in the second position;

wherein a distance between the chopping axis and the table plane being at least about 0.79 times the radius of the blade, and a distance between the arbor and the table plane when the saw assembly is in a lowered position is between about 0.671 and about 0.6775 times the radius of the blade.

2. The miter saw of claim 1, wherein the distance between the chopping axis and the table plane is between about 11.98 cm and about 12.25 cm.

3. The miter saw of claim 1, wherein the distance between the arbor and the table plane when the saw assembly is in the lowered position is between about 10.17 cm and about 10.38 cm.

4. The miter saw of claim 1, further comprising a substantially vertical fence attached to the base, the fence having a fence plane.

5. The miter saw of claim 4, wherein a distance between the chopping axis and the fence plane is between about 1.28 and about 1.292 times the radius of the blade, and a distance between the arbor and the fence plane when the saw assembly is in a lowered position is between about 0.60 and about 0.61 dines the radius of the blade.

6. The miter saw of claim 5, wherein the distance between the chopping axis and the fence plane is between about 19.40 cm and about 19.80 cm.

7. The miter saw of claim 5, wherein the distance between the arbor and the fence plane when the saw assembly is in the lowered position is between about 9.10 cm and about 9.35 cm.

\* \* \* \* \*